United States Patent
Nakano

(10) Patent No.: US 12,523,747 B2
(45) Date of Patent: Jan. 13, 2026

(54) OPTICAL APPARATUS, IN-VEHICLE SYSTEM, AND MOVING APPARATUS

(71) Applicant: CANON KABUSHIKI KAISHA, Tokyo (JP)

(72) Inventor: Masatsugu Nakano, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 820 days.

(21) Appl. No.: 17/889,457

(22) Filed: Aug. 17, 2022

(65) Prior Publication Data

US 2022/0390565 A1 Dec. 8, 2022

Related U.S. Application Data

(63) Continuation of application No. PCT/JP2020/047209, filed on Dec. 17, 2020.

(30) Foreign Application Priority Data

Mar. 2, 2020 (JP) ................................. 2020-034831
Dec. 1, 2020 (JP) ................................. 2020-199812

(51) Int. Cl.
  *G01S 7/481* (2006.01)
  *G01S 17/931* (2020.01)
  *G02B 17/06* (2006.01)

(52) U.S. Cl.
  CPC ........... *G01S 7/4811* (2013.01); *G01S 17/931* (2020.01); *G02B 17/0684* (2013.01)

(58) Field of Classification Search
  None
  See application file for complete search history.

(56) References Cited

U.S. PATENT DOCUMENTS

| | | | |
|---|---|---|---|
| 9,880,375 | B2 | 1/2018 | Nakano |
| 10,620,409 | B2 | 4/2020 | Nakano |

(Continued)

FOREIGN PATENT DOCUMENTS

| | | |
|---|---|---|
| CN | 101261365 A | 9/2008 |
| CN | 105301879 A | 2/2016 |

(Continued)

OTHER PUBLICATIONS

International Search Report issued by the Japan Patent Office on Feb. 9, 2021 in corresponding International Application No. PCT/JP2020/047209, with English translation.

(Continued)

*Primary Examiner* — Yuqing Xiao
*Assistant Examiner* — Clint Thatcher
(74) *Attorney, Agent, or Firm* — Carter, DeLuca & Farrell LLP

(57) ABSTRACT

An optical apparatus includes a deflection unit configured to deflect illumination light from a light source and to deflect reflected light from the object, and a light guide unit configured to guide the illumination light to the deflection unit and to guide the reflected light from the deflection unit to a light receiving unit. The light guide unit includes first and second passage areas, and a reflective area. The illumination light is branched into first and second illumination lights by the light guide unit. The first illumination light is emitted from the first passage area and the second illumination light is emitted from the second passage area so that an emission direction of the first illumination light and that of the second illumination light are not parallel to each other, and then the first illumination light and the second illumination light enter the deflection unit.

28 Claims, 16 Drawing Sheets

(56) References Cited

U.S. PATENT DOCUMENTS

| | | | |
|---|---|---|---|
| 11,385,334 B2* | 7/2022 | Kondo | G01S 17/08 |
| 2005/0206872 A1* | 9/2005 | Hua-Tang | G01S 7/4811 |
| | | | 356/5.01 |
| 2013/0301096 A1 | 11/2013 | Takahashi | |
| 2017/0184446 A1* | 6/2017 | Chen | G01S 17/04 |
| 2017/0261680 A1* | 9/2017 | Wald | G03F 7/70616 |
| 2018/0143302 A1 | 5/2018 | Osiroff et al. | |
| 2019/0271767 A1* | 9/2019 | Keilaf | G01S 17/931 |
| 2019/0277688 A1* | 9/2019 | Ringwald | G01S 7/4816 |
| 2019/0361124 A1* | 11/2019 | Ogawa | G01S 7/4811 |
| 2019/0369136 A1* | 12/2019 | Ota | G01P 5/26 |
| 2020/0158826 A1* | 5/2020 | Hinderling | G01S 7/4808 |
| 2021/0157000 A1* | 5/2021 | Imaki | G01S 17/58 |
| 2022/0113535 A1 | 4/2022 | Nakano | |

FOREIGN PATENT DOCUMENTS

| | | |
|---|---|---|
| CN | 106405830 A | 2/2017 |
| CN | 108027425 A | 5/2018 |
| CN | 108253886 A | 7/2018 |
| DE | 102015105393 A1 | 10/2016 |
| JP | H05-027188 A | 2/1993 |
| JP | H11-083755 A | 3/1999 |
| JP | H11-203701 A | 7/1999 |
| JP | 2008-216520 A | 9/2008 |
| JP | 2009-087413 A | 4/2009 |
| JP | 2019-194608 A | 11/2019 |
| JP | 2020-504291 A | 2/2020 |
| WO | 2008/078543 A1 | 7/2008 |
| WO | 2012/099151 A1 | 7/2012 |
| WO | 2018/091970 A1 | 5/2018 |

OTHER PUBLICATIONS

Chinese Office Action issued by the China National Intellectual Property Administration on Feb. 24, 2025 in corresponding CN Patent Application No. 202080097893.X, with English translation.

Yu, Q. et al., "Design of laser parallel confocal measurement system with single source and dual beam paths" Optics and Precision Engineering (Feb. 2013) pp. 281-286, vol. 21, No. 2, with English abstract.

International Report on Patentability issued in corresponding International Application No. PCT/JP2020/047209 dated Sep. 6, 2022, pp. 1-8, English Translation.

Chinese Office Action issued by the China National Intellectual Property Administration on Jul. 2, 2024 in corresponding CN Patent Application No. 202080097893.X, with English translation.

Extended European Search Report issued in corresponding EP Patent Application No. 20922878.2 dated Feb. 16, 2024, pp. 1-7.

* cited by examiner

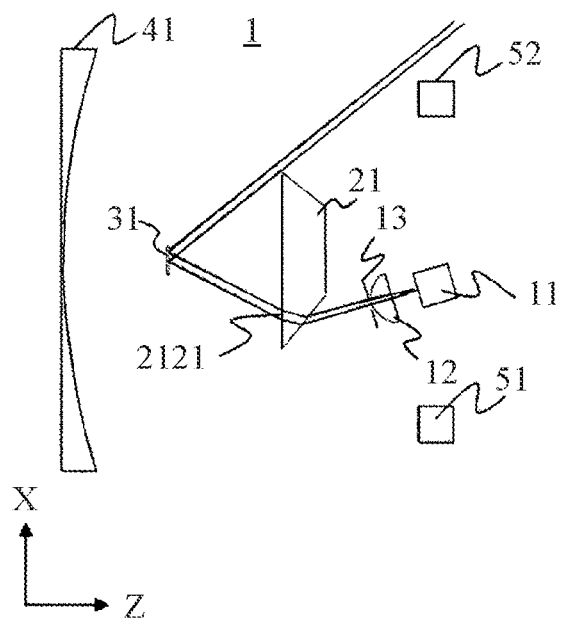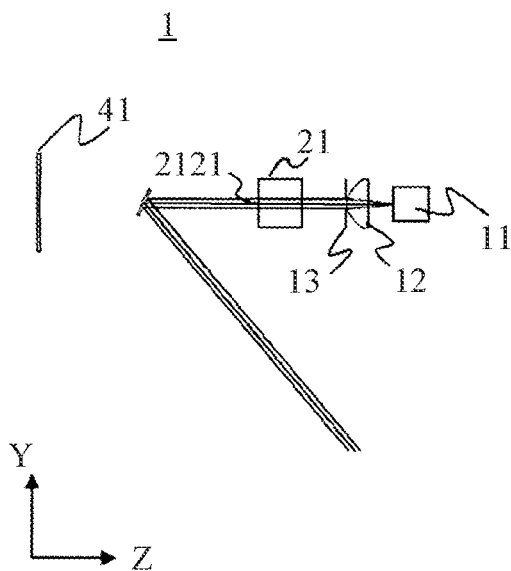
FIG. 3A  FIG. 3B
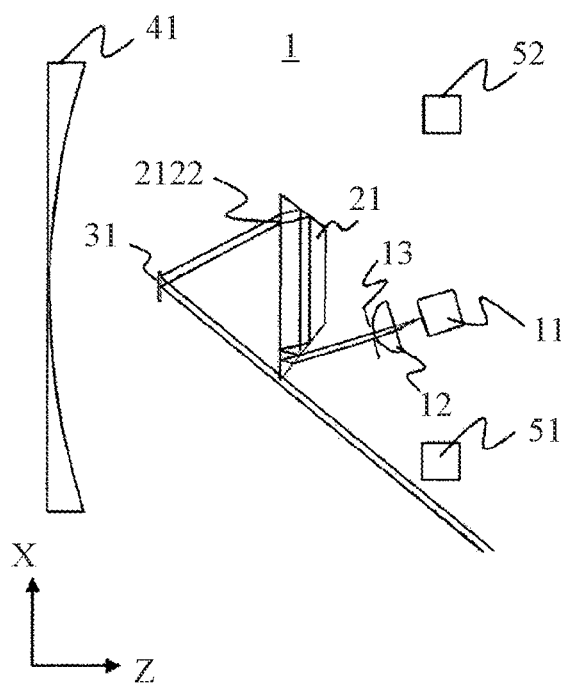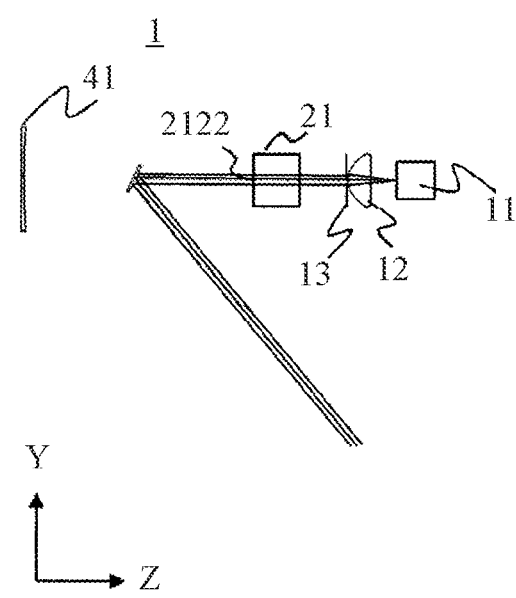
FIG. 4A  FIG. 4B

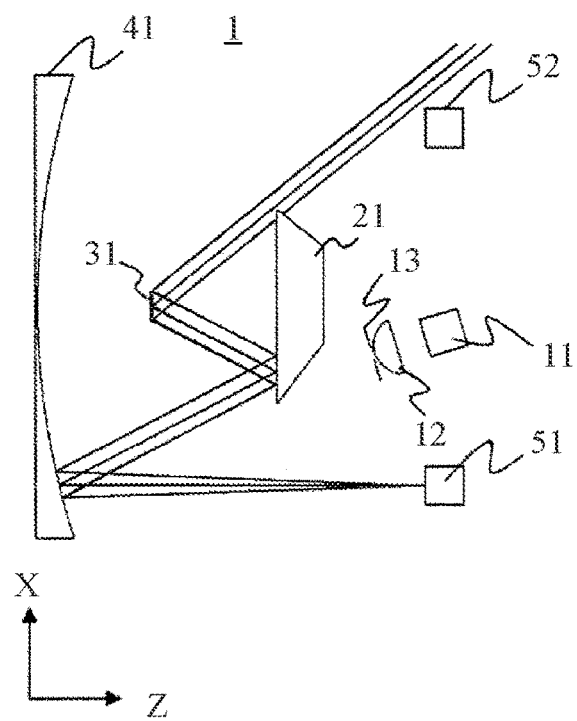
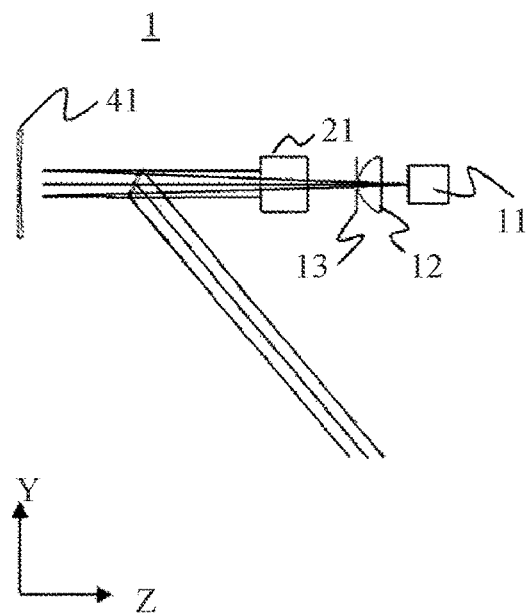
FIG. 5A  FIG. 5B
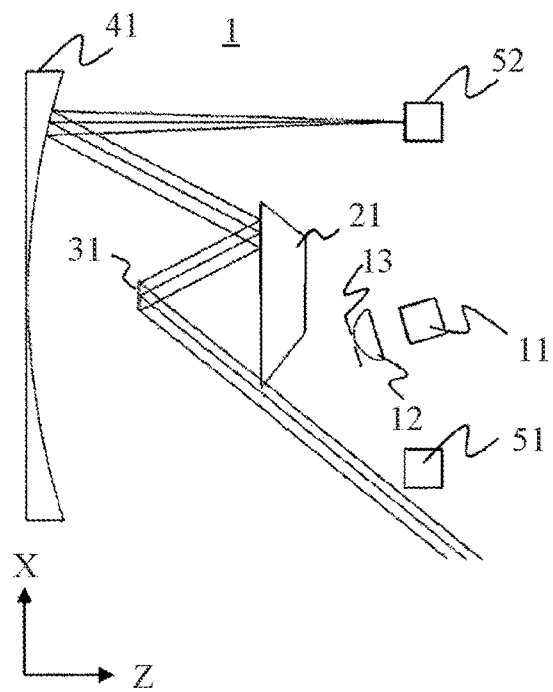
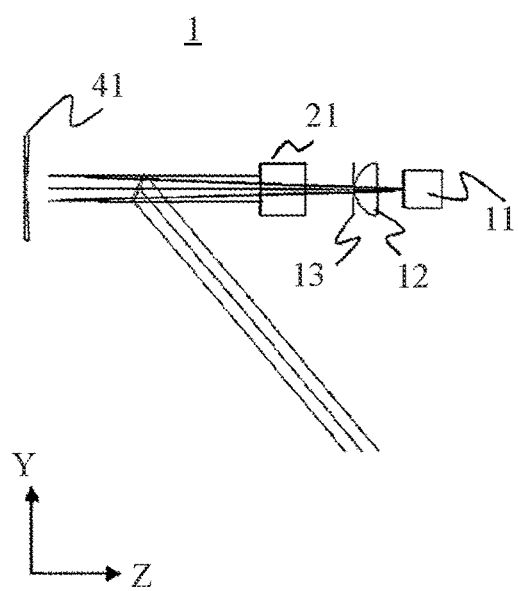
FIG. 6A  FIG. 6B

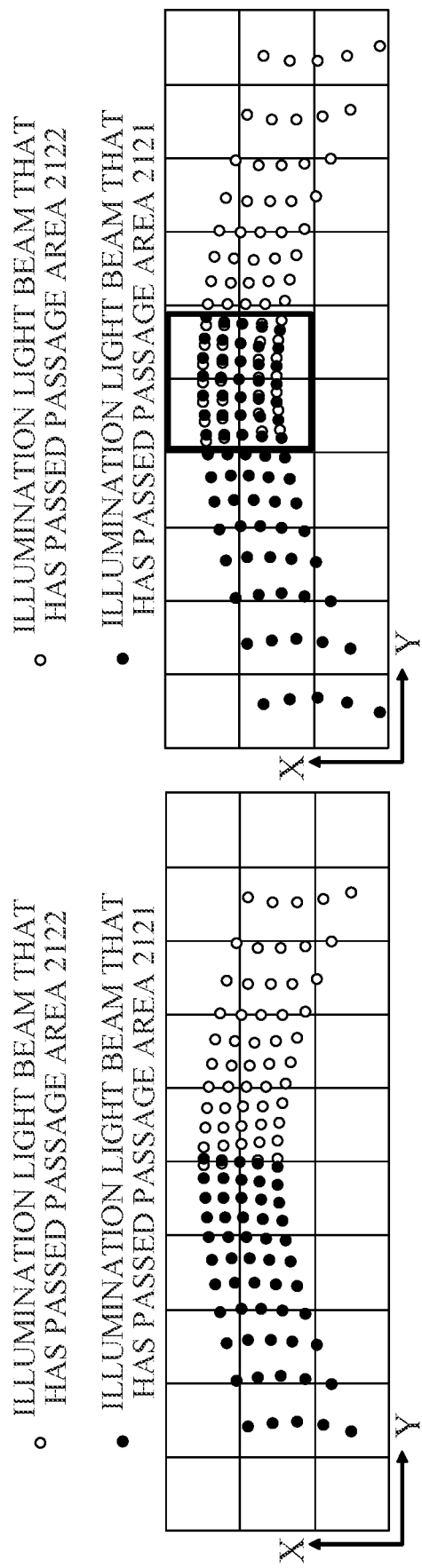

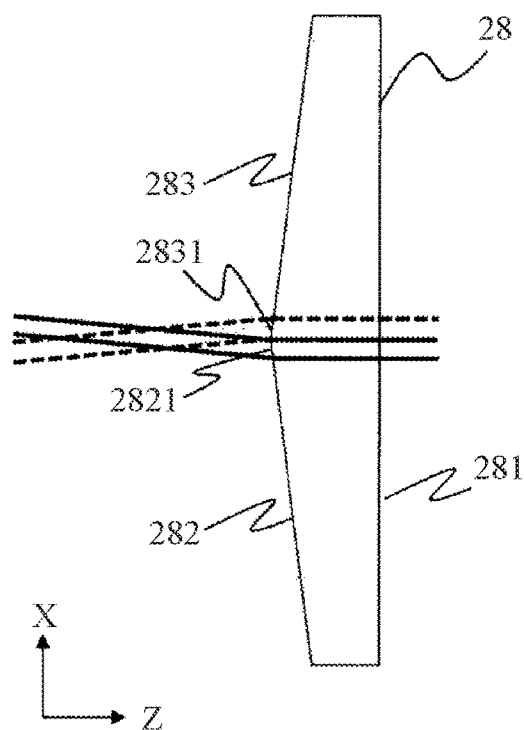
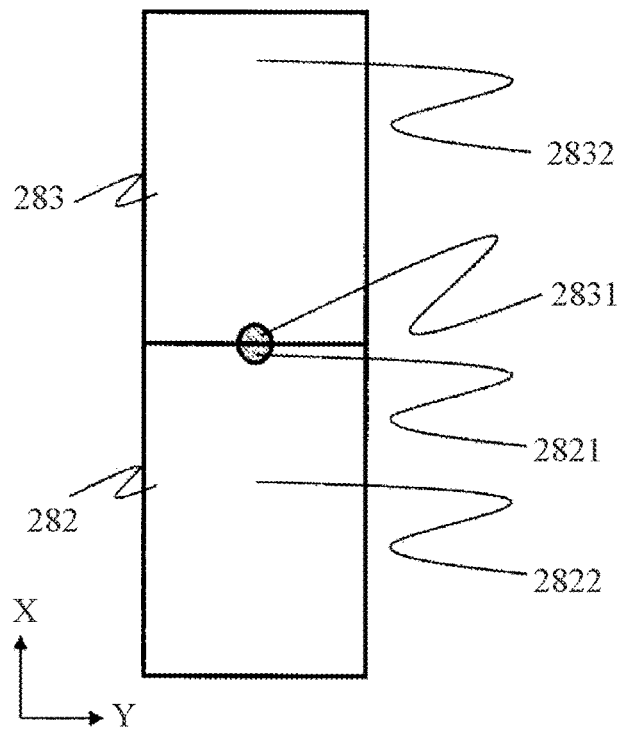
FIG. 12A  FIG. 12B
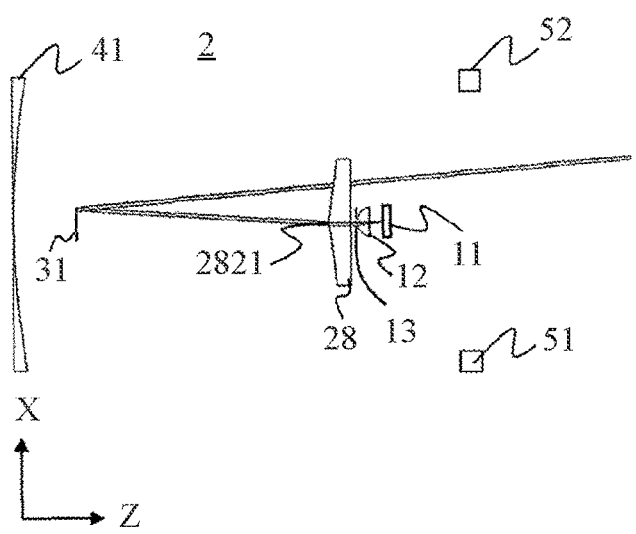
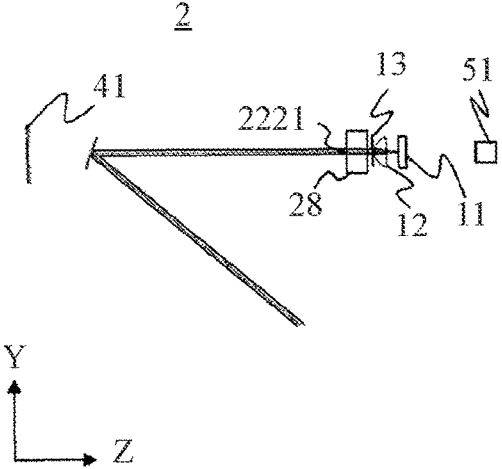
FIG. 13A  FIG. 13B

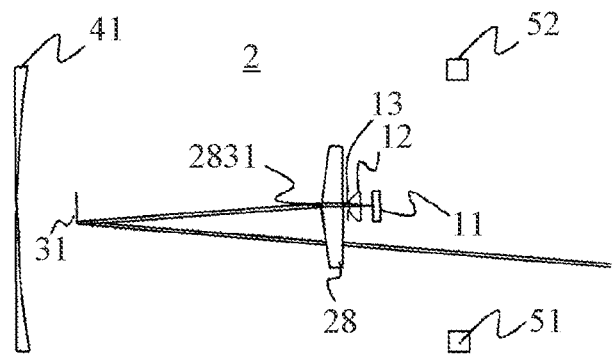
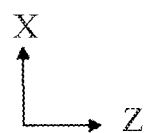
FIG. 14A
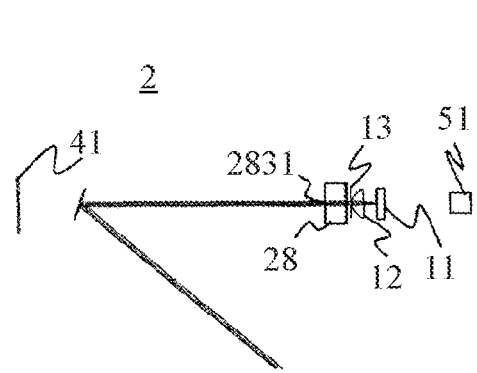
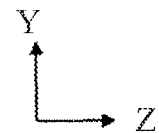
FIG. 14B
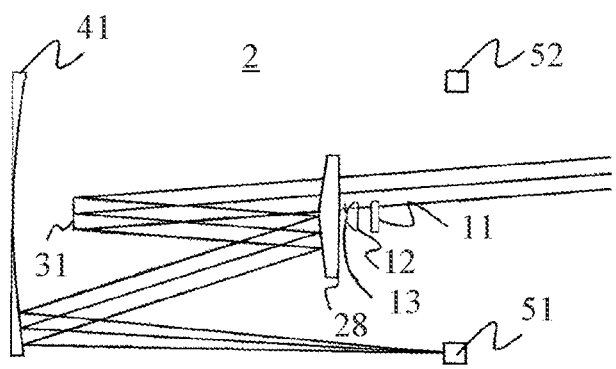
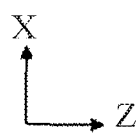
FIG. 15A
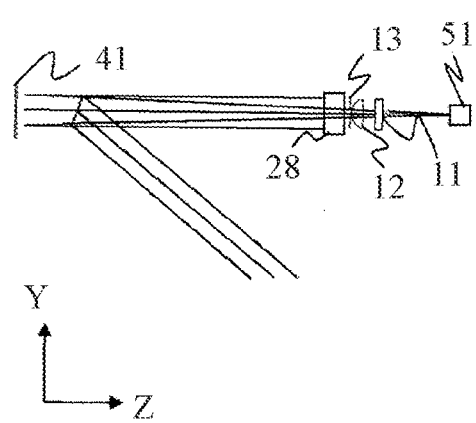
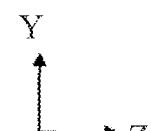
FIG. 15B

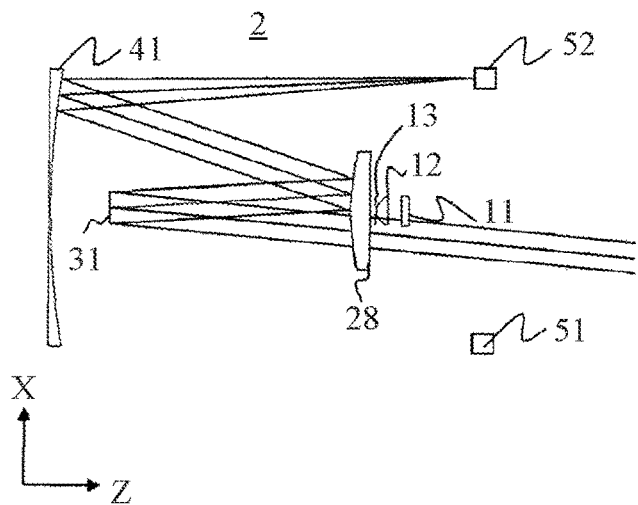
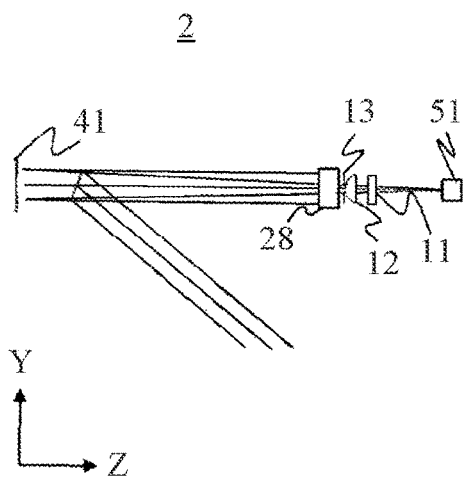
FIG. 16A
FIG. 16B
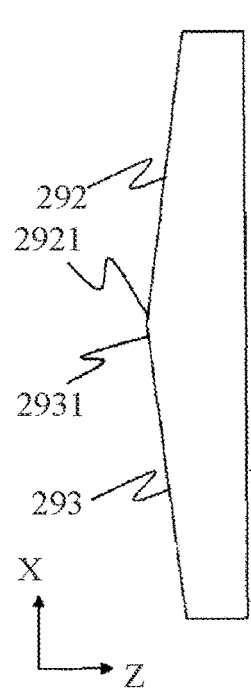
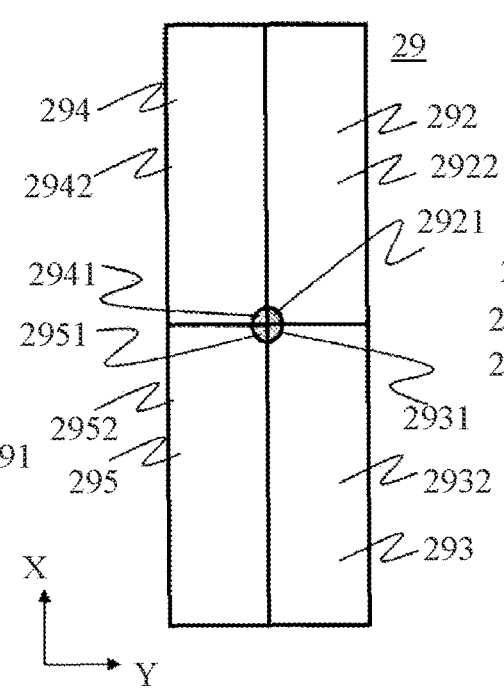
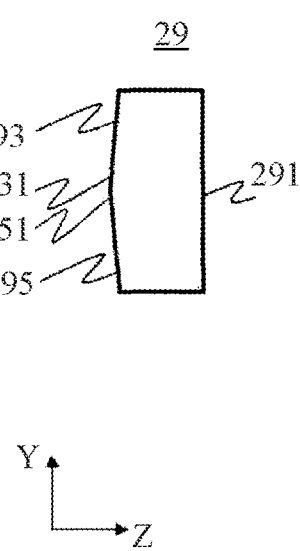
FIG. 17A
FIG. 17B
FIG. 17C

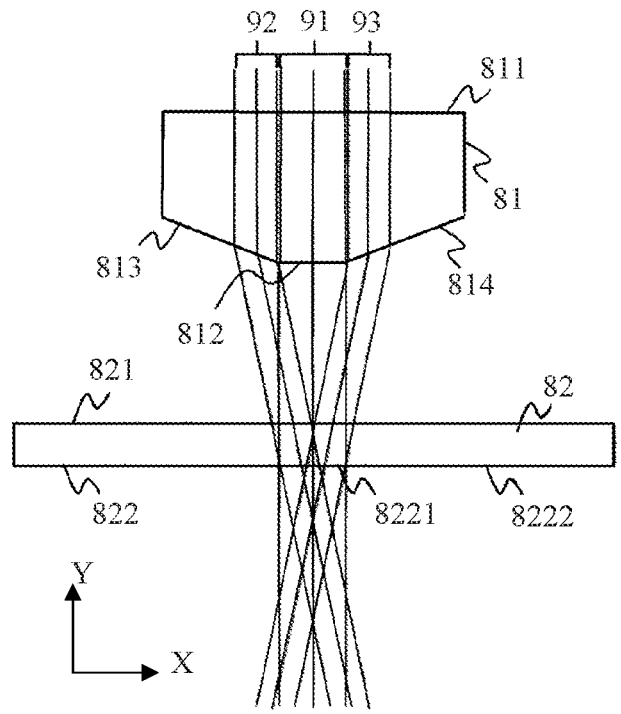 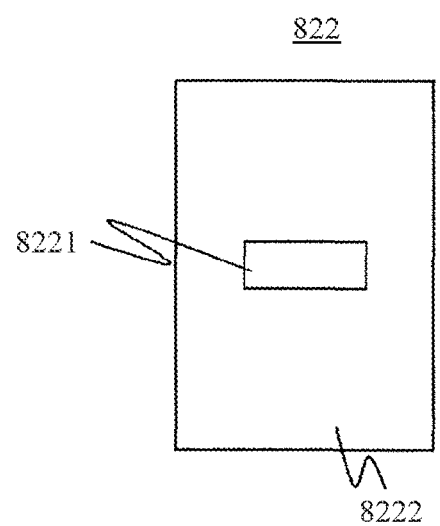
FIG. 21A    FIG. 21B
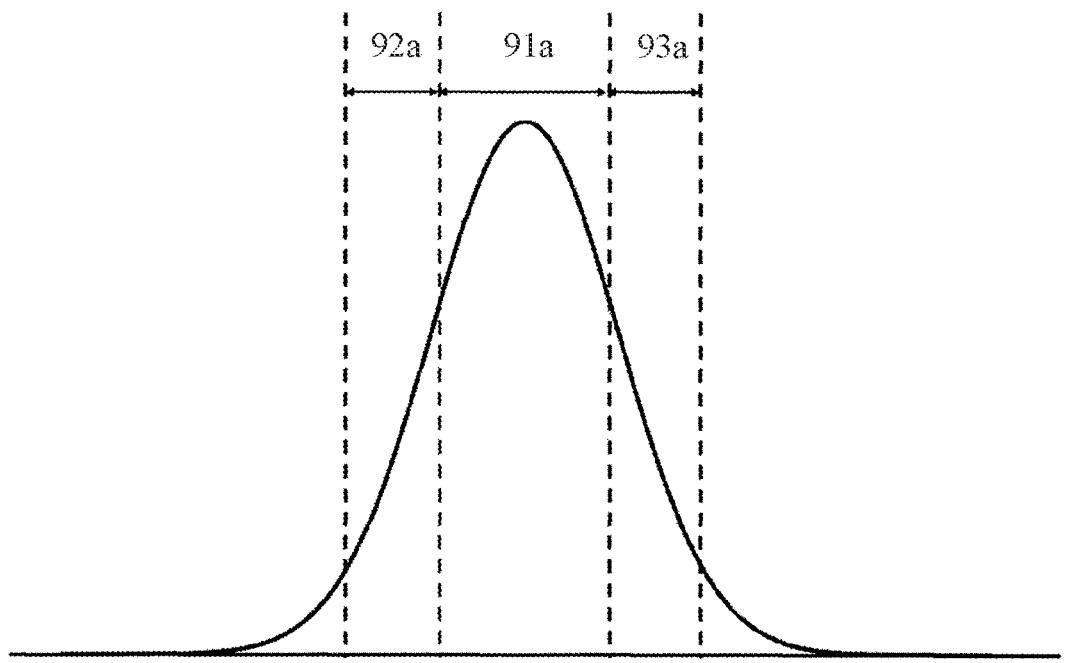
FIG. 22

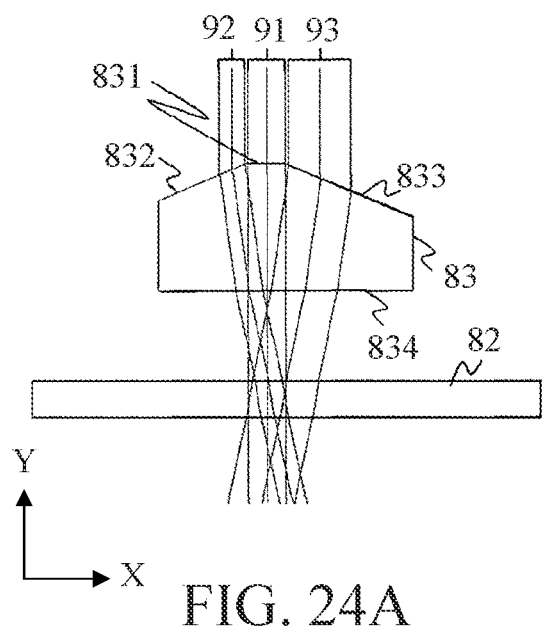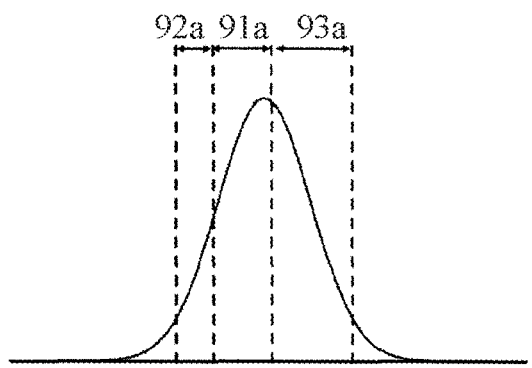
FIG. 24A                                   FIG. 24B
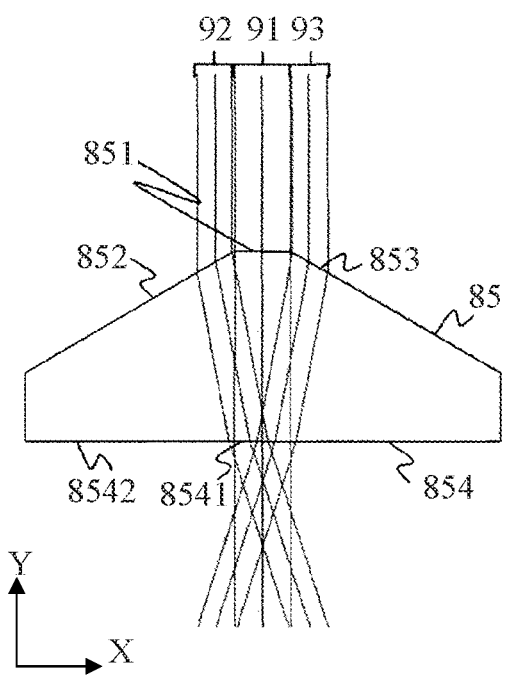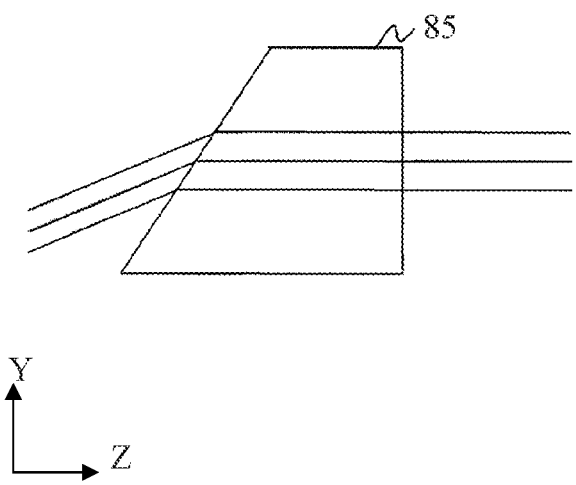
FIG. 25A                                   FIG. 25B

OPTICAL APPARATUS, IN-VEHICLE SYSTEM, AND MOVING APPARATUS

CROSS-REFERENCE TO RELATED APPLICATIONS

This application is a Continuation of International Patent Application No. PCT/JP2020/047209, filed Dec. 17, 2020, which claims the benefit of Japanese Patent Application No. 2020-034831, filed Mar. 2, 2020, and Japanese Patent Application No. 2020-199812, filed. Dec. 1, 2020 which are hereby incorporated by reference herein in their entirety.

BACKGROUND

Technical Field

The disclosure relates to an optical apparatus, an in-vehicle system, and a moving apparatus, each of which detects an object by receiving reflected light from the illuminated object.

Description of the Related Art

One known method for measuring a distance to an object is LiDAR (Light Detection and Ranging) that calculates the distance based on a period necessary to receive reflected light from the illuminated object or a phase of the reflected light.

The reflected light from the object becomes weaker as the object is more distant. In order to receive a large reflected light amount from the object, a diameter of a drive mirror for a deflection unit for illuminating and scanning the object may be increased, but in a case where the diameter of the drive mirror is increased, a changeable angle of the drive mirror becomes smaller and a scanning range of the object becomes narrower.

U.S. Patent Application Publication No. 2018/143302 discloses an apparatus that introduces illumination light from each of a plurality of light sources to a deflection unit at a different angle, and illuminates an object with the illumination light for each light source, in order to expand a scanning range of the object.

Japanese Patent Laid-Open No. 11-203701 discloses an apparatus that separates illumination light from a single light source using a prism, and introduces two illumination light beams to a deflection unit at different incident angles.

However, the apparatus disclosed in U.S. Patent Application Publication No. 2018/143302 needs the plurality of light sources and light receiving units that receive the reflected light from the object and correspond to the light sources, and thus the number of components is large and the apparatus becomes large.

The apparatus disclosed in Japanese Patent Laid-Open No. 11-203701 cannot expand the scanning range because one illumination light beam illuminates the object and the other illumination light beam is used to detect an angle of the deflection unit.

SUMMARY

The disclosure provides an optical apparatus, an in-vehicle system, and a moving apparatus, each of which is small and has a wide scanning range.

An optical apparatus as one aspect of the disclosure includes a deflection unit configured to deflect illumination light from a light source to scan an object, and to deflect reflected light from the object, and a light guide unit configured to guide the illumination light to the deflection unit, and to guide the reflected light from the deflection unit to a light receiving unit, wherein the light guide unit includes a first passage area and a second passage area through which the illumination light passes, and a reflective area for reflecting the reflected light, wherein the illumination light is branched into first illumination light and second illumination light by the light guide unit, and wherein the first illumination light is emitted from the first passage area and the second illumination light is emitted from the second passage area so that an emission direction of the first illumination light and an emission direction of the second illumination light are not parallel to each other, and then the first illumination light and the second illumination light enter the deflection unit.

Further features of the disclosure will become apparent from the following description of exemplary embodiments with reference to the attached drawings.

BRIEF DESCRIPTION OF THE DRAWINGS

FIGS. 3A and 3B are optical path diagrams of illumination light transmitting through one of passage areas.

FIGS. 4A and 4B are optical path diagrams of illumination light transmitting through another passage area.

FIGS. 5A and 5B are optical path diagrams of reflected light corresponding to the illumination light transmitting through one of the passage areas.

FIGS. 6A and 6B are optical path diagrams of reflected light corresponding to the illumination light transmitting through the other passage area.

FIGS. 7A and 7B are explanatory diagrams of an illumination range.

FIGS. 12A and 12B are schematic views of principal part of a branching optical element according to the second embodiment.

FIGS. 13A and 13B are optical path diagrams of illumination light transmitting through one of the passage areas.

FIGS. 14A and 14B are optical path diagrams of illumination light transmitting through another passage area.

FIGS. 15A and 15B are optical path diagrams of reflected light corresponding to the illumination light transmitting through one of the passage areas.

FIGS. 16A and 16B are optical path diagrams of reflected light corresponding to the illumination light transmitting through the other passage area.

FIGS. 17A, 17B, and 17C are schematic diagrams of principal part of a variation of the branching optical element according to the second embodiment.

FIGS. 21A and 21B are schematic diagrams of principal part of a branching optical element according to the fourth embodiment.

FIG. 22 is a diagram showing a light amount distribution in a case where the illumination light according to the fourth embodiment passes through the branching optical element.

FIGS. 24A and 24B are schematic diagrams of principal part of a variation of the branching optical element according to the fourth embodiment.

FIGS. 25A and 25B are schematic diagrams of principal part of another variation of the branching optical element according to the fourth embodiment.

DESCRIPTION OF THE EMBODIMENTS

Figure 1:
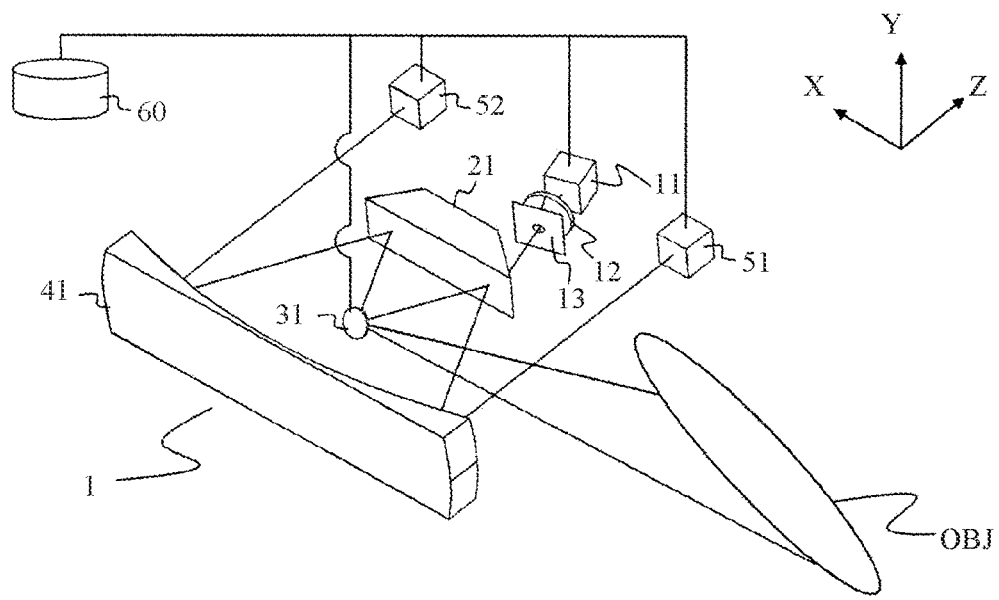
FIG. 1 is a schematic view of principal part of an optical apparatus according to a first embodiment.

Referring now to the accompanying drawings, a detailed description will be given of embodiments according to the disclosure. Corresponding elements in respective figures will be designated by the same reference numerals, and a duplicate description thereof will be omitted.

An optical apparatus using LiDAR includes an illumination system that illuminates an object and a light receiving system that receives reflected or scattered light from the object. LiDAR can be classified into a coaxial system in which some of optical axes of the illumination system and the light receiving system coincide with each other, and a noncoaxial system in which these optical axes do not coincide with each other. The optical apparatus according to this embodiment is suitable for the coaxial system of LiDAR.

The optical apparatus according to each embodiment is used as an automatic driving support system for a vehicle such as an automobile, for example. The object is, for example, a pedestrian, an obstacle, a vehicle, etc., and is separated by about 1 to 300 m. The optical apparatus according to each embodiment measures a distance to the object, and controls the direction and speed of the vehicle based on the measurement result.

First Embodiment

FIG. 1 is a schematic view of the principal part of an optical apparatus 1 according to this embodiment. The optical apparatus 1 includes a light source 11, a collimator lens 12, a diaphragm 13, a branching optical element (light guide unit, branching unit) 21, a drive mirror (deflection unit) 31, a condenser mirror 41, and light receiving elements (light receiving units) 51 and 52, and a control unit 60.

A coordinate system according to this embodiment is defined as illustrated in FIG. 1. More specifically, one swing direction of the drive mirror 31 is set to an X-axis, the other swing direction orthogonal to the X-axis is set to a Y-axis, and a Z-axis is a direction orthogonal to the X-axis and the Y-axis.

The light source 11 can use a semiconductor laser or the like, which is a laser having high energy concentration and good directivity. For example, a semiconductor laser having a wavelength in the near-infrared region is used. The diaphragm 13 has an elliptical shape having a minor axis of 1.3 mm parallel to the Y-axis direction and a major axis of 1.6 mm. Divergent light (illumination light) emitted from the light source 11 is collimated by the collimator lens 12 and becomes parallel light. The parallel light here includes not only a strictly parallel light beam but also weakly divergent light and weakly convergent light. After passing through the collimator lens 12, the illumination light is restricted by the diaphragm 13 and travels to the branching optical element 21.

Figures 2A, 2B:
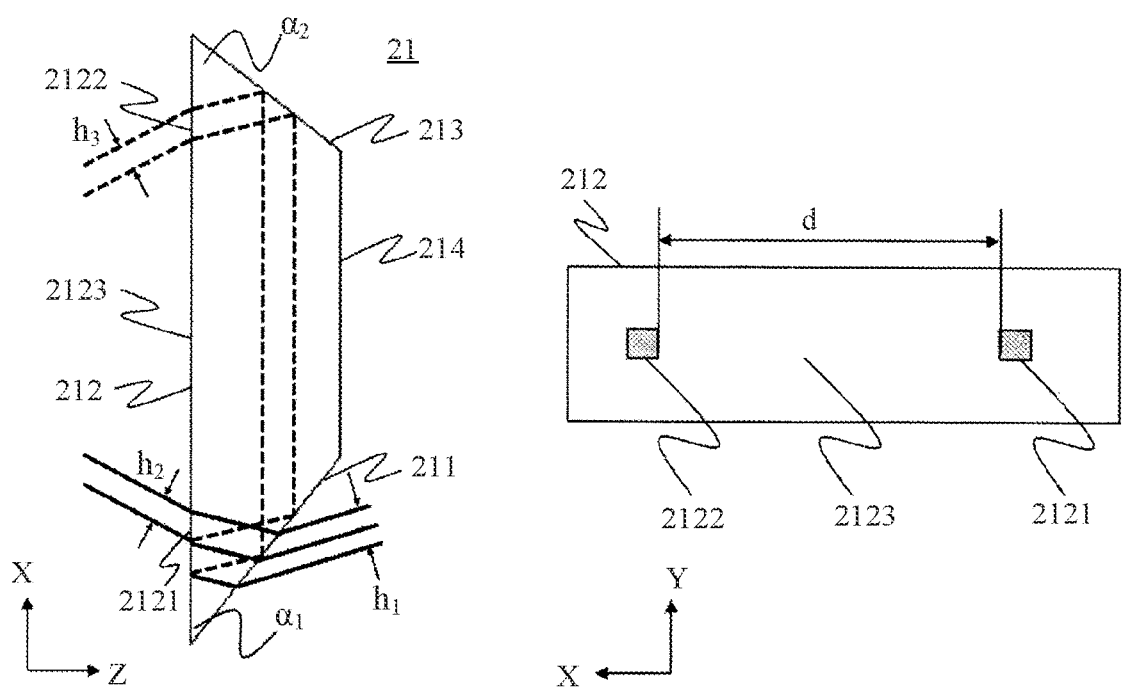
FIGS. 2A and 2B are schematic diagrams of principal part of a branching optical element according to the first embodiment.

FIGS. 2A and 2B are schematic diagrams of the principal part of the branching optical element 21 according to this embodiment. The branching optical element 21 has a first surface 211, a second surface 212, a third surface 213, and a fourth surface 214. FIG. 2A illustrates a path of the illumination light passing through the branching optical element 21. FIG. 2B is a view of the second surface 212 viewed from a plane normal direction.

The second surface 212 has passage areas 2121 and 2122 for transmitting the illumination light, and a reflective area (reflective surface) 2123 for reflecting the reflected light from an object OBJ. A distance d between the passage areas 2121 and 2122 is 15.41 mm. In this embodiment, each of the passage areas 2121 and 2122 has a rectangular shape of 1.3 mm in the Y-axis direction and 1.35 mm in the Z-axis direction, but the disclosure is not limited to this example. For example, it may have a semicircular shape. An antireflection film may be formed on the passage areas 2121 and 2122. In the reflective area 2123, a layer that reflects incident light from the inside and incident light from the outside of the branching optical element 21 is made of a metal film, a dielectric film, or the like. A layer for absorbing light may be formed on a non-effective area where the light of the reflective area 2123 does not reach.

The branching optical element 21 may be made of a material having a high transmittance for the wavelength of the light emitted from the light source 11 and having few impurities and defects. In this embodiment, the material for the branching optical element 21 has a refractive index of 1.972.

FIGS. 3A and 3B are optical path diagrams of the illumination light transmitting through the passage area (first passage area) 2121. FIGS. 4A and 4B are optical path diagrams of the illumination light transmitting through the passage area (second passage area) 2122. FIGS. 5A and 5B are optical path diagrams of the reflected light from the object OBJ illuminated by the illumination light transmitting through the passage area 2121. FIGS. 6A and 6B are optical path diagrams of the reflected light from the object OBJ illuminated by the illumination light transmitting through the passage area 2122. In each figure, FIGS. 3A, 4A, 5A, and 6A are XZ sectional views, and FIGS. 3B, 4B, 5B, and 6B are YZ sectional views.

This embodiment illustrates a means for branching the light from the first surface by spatially dividing the light.

The light that has passed through the diaphragm 13 is refracted on the first surface 211 according to Snell's law, travels in the branching optical element 21, and reaches the second surface 212. Of the illumination light that has reached the second surface 212, the light that has entered the passage area 2121 is refracted and emitted according to Snell's law. Hereinafter, this optical path will be referred to as a first optical path (solid line in FIG. 2A). On the other hand, of the illumination light that has reached the second surface 212, the light that has entered the reflective area 2123 is reflected, reaches the first surface 211 again, and then is totally reflected toward the third surface 213 having the reflective area. The light incident on the third surface 213 is totally reflected, refracted in the passage area 2122 according to Snell's law, and emitted. Hereinafter, this optical path will be referred to as a second optical path (broken line in FIG. 2A). In this way, the illumination light is branched into two illumination lights (first illumination light and second illumination light) by the branching optical element 21, and the first and second illumination lights are emitted from the first and second passage areas so that their emission directions form an angle. "Forming an angle" does not include a case where the emission directions of the two illumination lights are parallel (the emission directions of the two illumination lights form 0 degrees). In addition, that includes a case where the passage areas are not formed on the same surface and the emission angles of the two illumination lights are equal to each other but the emission directions of the two illumination lights are different from each other.

The drive mirror 31 is a biaxial drive mirror configured to swing around the X-axis and the Y-axis, and is, for example, a Micro Electro Mechanical System (MEMS) mirror. In this embodiment, the drive mirror 31 has a swing angle of ±15 degrees and a driving frequency of about 1 kHz. The drive mirror 31 deflects the illumination light to scan the object OBJ, and also deflects the reflected light from the object OBJ to guide the light to the branching optical element 21.

The illumination light of the first optical path and the second optical path is reflected by the drive mirror 31, passes under the branching optical element 21 and the light source 11, and then illuminates the object OBJ while being two-dimensionally scanned. Two light beams emitted from the branching optical element 21 are incident on the drive mirror 31 at different angles and are scanned to illuminate different areas. That is, the illumination range can be expanded.

FIGS. 7A and 7B are explanatory diagrams of an illumination range. FIG. 7A illustrates the illumination range in a case where the drive mirror 31 swings by ±6 degrees around the X-axis and ±15 degrees around the Y-axis. In this case, since the two illumination ranges are set so as to exactly overlap each other at the center of the entire illumination range, the entire illumination range is greatly expanded. FIG. 7B illustrates the illumination range in a case where the drive mirror 31 swings by ±1.6 degrees around the X-axis and ±24 degrees around the Y-axis. In this case, since the two illumination ranges are set so as to overlap each other by ±9 degrees at the center of the entire illumination range, the distance can be measured by overlapping the central portions while expanding the entire illumination range.

The condenser mirror 41 is used as the same mirror for the lights in the first optical path and the second optical path, but may be separated at a central position where the light does not pass.

The light receiving elements 51 and 52 can use Photodiode (PD), Avalanche Photodiode (APD), Single PHTON Avalanche Diode (SPAD), and the like.

The reflected light from the object OBJ is deflected to the branching optical element 21 by the drive mirror 31. More specifically, the reflected light of the first optical path passes under the light source 11 and the branching optical element 21 in the optical path in a direction opposite to the illumination light, then enters the drive mirror 31 and is biased toward a position near the passage area 2121. Of the deflected light, the light that reaches the reflective area 2123 is reflected toward the condenser mirror 41, condensed on and received by the light receiving element 51. The reflected light on the second optical path passes under the light source 11 and the branching optical element 21 in the optical path in the direction opposite to the illumination light, then enters the drive mirror 31, and is deflected toward a position near the passage area 2122. Of the deflected light, the light that reaches the reflective area 2123 is reflected toward the condenser mirror 41, condensed on and received by the light receiving element 52.

The control unit 60 controls the light source 11, the drive mirror 31, and the light receiving elements 51 and 52. More specifically, the control unit 60 drives the light source 11 and the drive mirror 31 at predetermined drive voltages and driving frequencies, respectively, and measures a light receiving waveform during light-receiving by the light receiving elements 51 and 52 at specific frequencies. The control unit 60 determines the distance to the object OBJ using a difference between the light receiving time of the light receiving elements 51 and 52 and the light emitting time of the light source 11, or a difference between a phase of the light receiving signal obtained by the light receiving elements 51 and 52 and a phase of the output signal of the light source 11.

The following expression (1) may be satisfied where $\alpha_1$ is an angle (degree) formed between the first surface 211 and the second surface 212 of the branching optical element 21 and $\alpha_2$ is an angle (degree) formed between the second surface 212 and the third surface 213:

$$\alpha_1 + \alpha_2 = 90 \quad (1)$$

By satisfying the expression (1), the reflected light reflected by the first surface 211 in the second optical path becomes parallel to the second surface 212, and the light emitted from the passage area 2121 and the light emitted from the passage area 2122 can have angles with the same absolute value but different signs. As a result, the angles incident on the drive mirror 31 have the same absolute value, but the directions are opposite to each other, so that the areas of the respective illumination ranges are equal, and the object OBJ can be illuminated symmetrically with respect to the Y-axis.

In this embodiment, the angle $\alpha_1$ formed between the first surface 211 and the second surface 212 is 38.2 degrees about the Y-axis, and the angle $\alpha_2$ formed between the second surface 212 and the third surface 213 is 51.8 degrees about the Y-axis. That is, the configuration according to this embodiment satisfies the expression (1), and as illustrated in FIGS. 7A and 7B, the areas of the respective illumination ranges are equal.

While the illumination light passes through the branching optical element 21, it is refracted twice on the first surface 211 and the second surface 212, and the light beam diameter (beam diameter) is multiplied. In this embodiment, a light beam diameter $h_2$ of the illumination light emitted from the passage area 2121 and a light beam diameter $h_3$ of the illumination light emitted from the passage area 2122 are set equal to each other. In this case, the following expression (2) is established between a light beam diameter $h_1$ of the illumination light restricted by the diaphragm 13 and entering the first surface 211 and the light beam diameter $h_2$ of the illumination light emitted from the passage area 2121. $\theta_1$, $\theta_2$, $\theta_3$, and $\theta_4$ are an incident angle on the first surface 211, an exit angle from the first surface 211, an incident angle on the second surface 212, and an exit angle from the passage area 2121 of the illumination light.

$$\frac{2h_2}{h_1} = \frac{\cos\theta_2\cos\theta_4}{\cos\theta_1\cos\theta_3} \quad (2)$$

Expression (2) is larger than 1 in a case where the angle $\theta_1$ at which the illumination light enters the first surface 211 is larger than the angle $\theta_4$ at which the illumination light is emitted from the passage area 2121. That is, the light beam diameter of the illumination light is expanded while the illumination light passes through the branching optical element 21. In a case where the light beam diameter is expanded, a divergence angle of the illumination light becomes smaller, and the spread of the illumination light in a distant place can be suppressed. By suppressing the divergence of the illumination light, it is possible to improve the resolution and the illuminance at a distant place.

In this embodiment, the angles $\theta_1$, $\theta_2$, $\theta_3$, and $\theta_4$ are 55.2 degrees, 24.6 degrees, 13.6 degrees, and 27.6 degrees, respectively, and the expression (2) is 1.45 and the illumination light is expanded.

A light amount of the illumination light in the first optical path may be approximately equal to that in the second optical path. By making the light amounts of the illumination light approximately equal to each other, the distance measurement accuracy does not change for each illumination range and highly reliable measurement can be performed. Calibration for each illumination range is not required. In this embodiment, the transmittances of the passage areas 2121 and 2122 and the reflectance of the reflective areas 2123 are 100%, respectively, but the areas, the positions, transmittances, or reflectances of the passage areas 2121 and 2122 may be fine-adjusted so that their light amounts can be equal in other cases as well.

Figure 8:
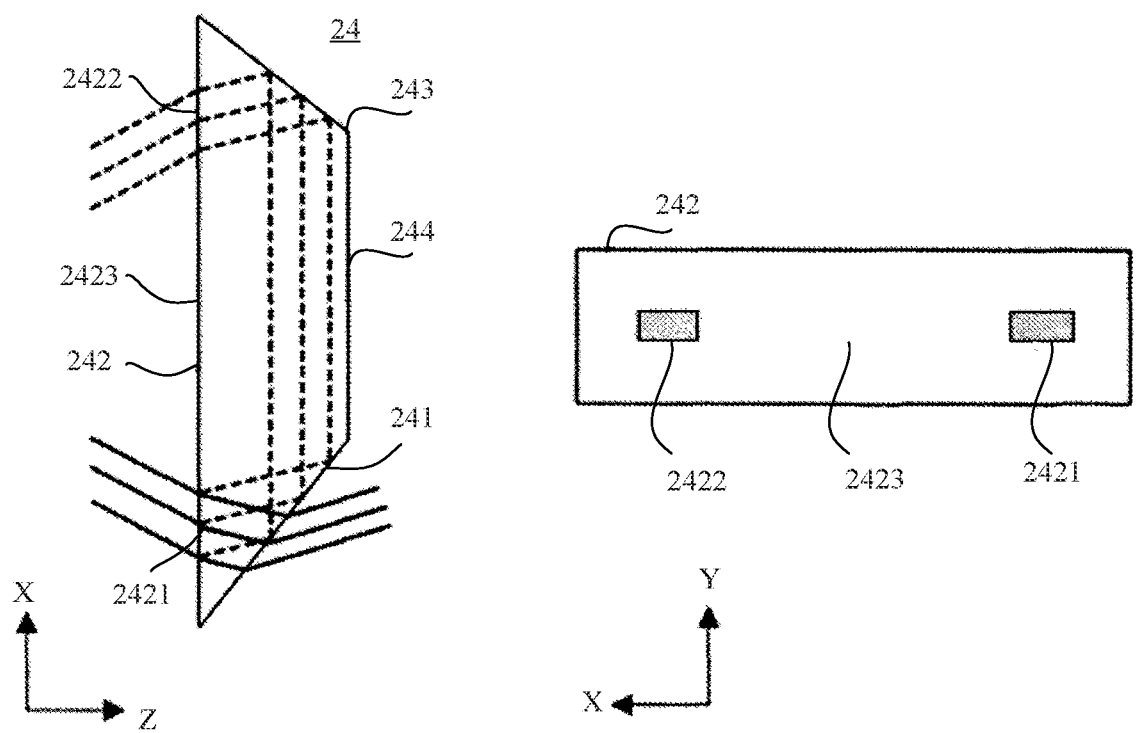
FIG. 8 is a schematic diagram of principal part of a variation of the branching optical element according to the first embodiment.

FIG. 8 is a schematic diagram of the principal part of the branching optical element 24 according to a variation of the branching optical element 21. The branching optical element 24 has the same external shape as that of the branching optical element 21. FIG. 8(a) illustrates the path of the illumination light passing through the branching optical element 24. FIG. 8B is a view of the second surface 242 viewed from the plane normal direction.

The second surface 242 has passage areas 2421 and 2422 for transmitting the illumination light, and a reflective area 2423 for reflecting the reflected light from the object OBJ. This variation illustrates a means for branching the light from the first surface by dividing the light intensity.

For example, in this variation, the passage area 2421 has characteristics with a transmittance of 50% and a reflectance of 50%, and the passage area 2422 has characteristics of a transmittance of 99% and a reflectance of 1%. In this variation, these characteristics are set in order to make the light amounts of the first optical path and the second optical path approximately equal to each other, but the disclosure is not limited to these characteristics.

The light incident from the first surface 241 reaches the passage area 2421 of the second surface 242. At this time, due to the characteristics of the passage area 2421, 50% of the intensity of the light beam transmits while 50% is reflected. The transmitting light forms the first optical path as in FIGS. 2A and 2B. The reflected light is totally reflected on the first surface 241 and further totally reflected on the third surface 243, and is emitted from the passage area 2422 and forms the second optical path. Thereafter, both the first optical path and the second optical path enter the drive mirror 31.

On the other hand, the reflected light from the drive mirror 31 is reflected on the passage areas 2421 and 2422 and the reflective area 2423, enters and is received by the light receiving element corresponding to each surface.

Figure 9:
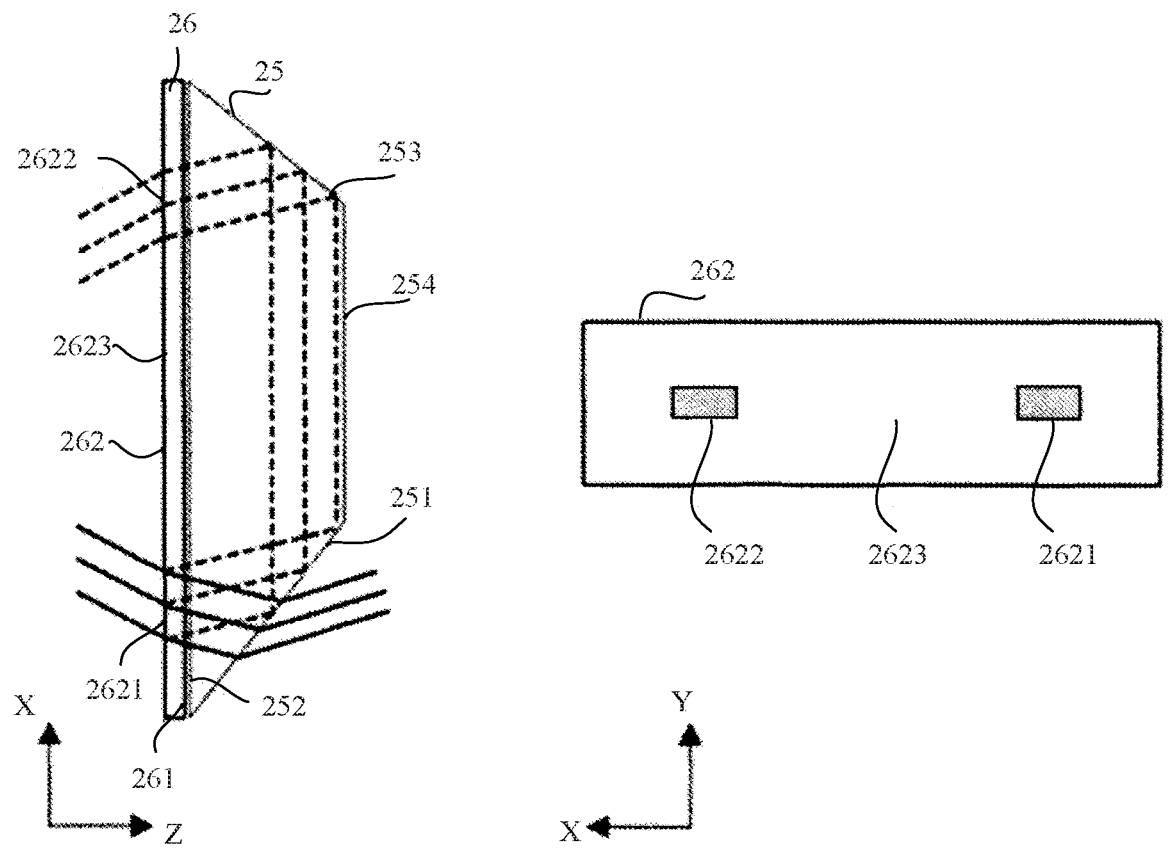
FIG. 9 is a schematic diagram of principal part of another variation of the branching optical element according to the first embodiment.

FIG. 9 is a schematic diagram of the principal parts of the branching optical elements 25 and 26 according to a variation of the branching optical element 21. The branching optical element 25 has the same external shape as that of the branching optical element 21. FIG. 9(a) illustrates the path of the illumination light passing through the branching optical elements 25 and 26. FIG. 9(b) is a view of the second surface 262 viewed from the plane normal direction.

The branching optical element 26 is a flat plate, and the second surface 262 has passage areas 2621 and 2622 for transmitting the illumination light, and a reflective area 2623 for reflecting the reflected light from the object OBJ. This variation illustrates a means for branching light from the first surface utilizing polarization.

In this variation, the passage area 2621 is a polarization beam splitter surface having characteristics of a transmittance of 100% and a reflectance of 0% in a first polarization direction and a transmittance of 0% and a reflectance of 100% in a second polarization direction, and the passage area 2622 has characteristics of a transmittance of 99% and a reflectance of 1%. In this variation, the above characteristics are set in order to make the light amounts of the first optical path and the second optical path approximately equal to each other, but the disclosure is not limited to these characteristics.

The light incident from the first surface 251 of the branching optical element 25 may be circularly polarized or unpolarized. In particular, in a case where a semiconductor laser is used for the light source 11, the polarization characteristic of the laser beam is linear polarization, so it is desirable to convert it into circular polarization using a quarter waveplate before it reaches the branching optical element 25.

The light incident from the first surface 251 of the branching optical element 25 passes through the second surface 252 and the first surface 261 of the branching optical element 26, and then reaches the passage area 2621. At this time, due to the polarization characteristics of the passage area 2621, the light in the first polarization direction (first polarized light component) transmits and the light in the second polarization direction second polarized light component) is reflected. The transmitting light forms the first optical path as in FIG. 2. The reflected light is totally reflected by the first surface 251 of the branching optical element 25, further totally reflected by the third surface 253, and emitted from the passage area 2622 to form the second optical path. Thereafter, both the first optical path and the second optical path enter the drive mirror 31.

On the other hand, the reflected light from the drive mirror 31 is reflected on the passage areas 2621 and 2622 and the reflective area 2623, introduced to and received by the light receiving element corresponding to each surface.

Figure 10:
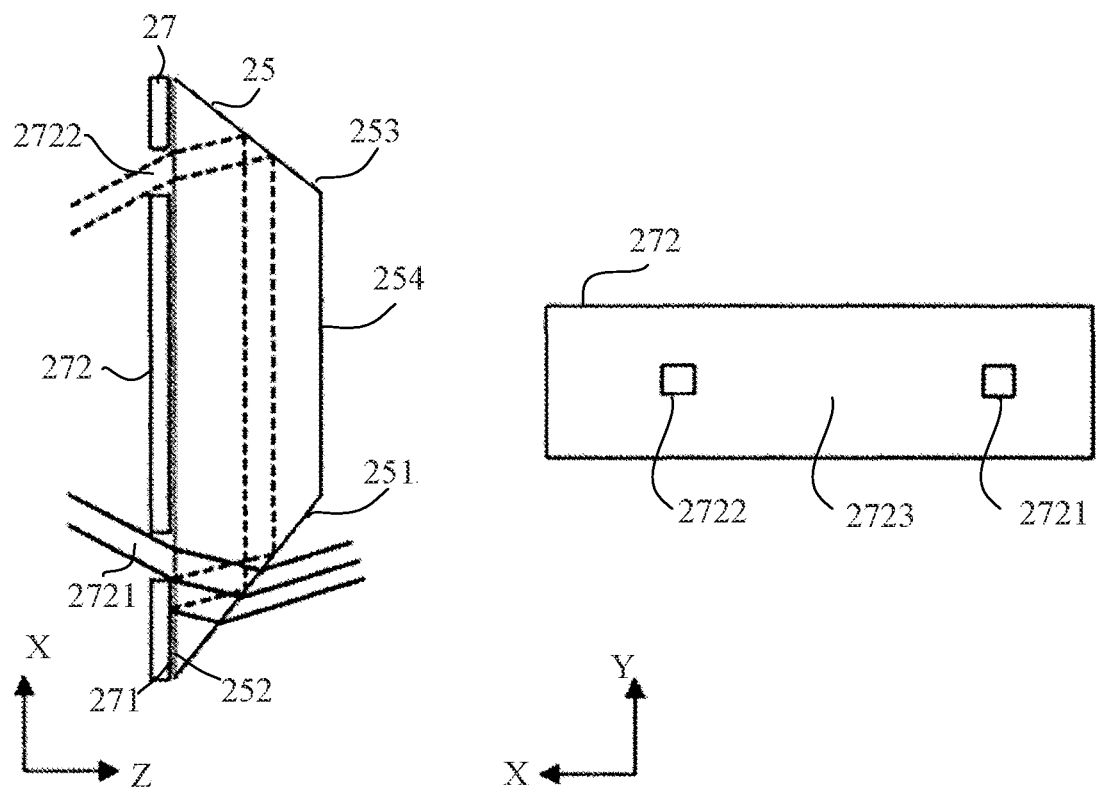
FIG. 10 is a schematic diagram of principal part of another variation of the branching optical element according to the first embodiment.

FIG. 10 is a schematic diagram of the principal part of the branching optical elements 25 and 27 according to a variation of the branching optical element 21. The branching optical element 25 has the same external shape as that of the branching optical element 21. FIG. 10(a) illustrates the path of the illumination light passing through the branching optical elements 25 and 27. FIG. 10(b) is a view of the reflective area 272 viewed from the plane normal direction.

The branching optical element 27 is a flat plate, and has passage areas 2721 and 2722, which are holes through which the illumination light passes, a reflective area 271 for reflecting the illumination light from the light source 11, and a reflective area 272 for reflecting the reflected light from the object OBJ.

The light incident from the first surface 251 of the branching optical element 25 passes through the second surface 252 and then reaches the reflective area 271 of the branching optical element 27. Of the illuminating light that has reached it, the light that has entered the passage area 2721 passes through the branching optical element 27 as it is, and this optical path will be referred to as a first optical path. On the other hand, the illumination light that has reached the reflective area 272 is reflected, totally reflected by the first surface 251 of the branching optical element 25, further totally reflected by the third surface 253, and emitted from the passage area 2722, and forms the second optical path. Thereafter, both the first optical path and the second optical path enter the drive mirror 31.

On the other hand, the reflected light from the drive mirror 31 is reflected on the reflective area 272, introduced to and received by the light receiving element corresponding to each surface.

As described above, the configuration according to this embodiment is small but can expand the scanning range.

Second Embodiment

Figure 11:
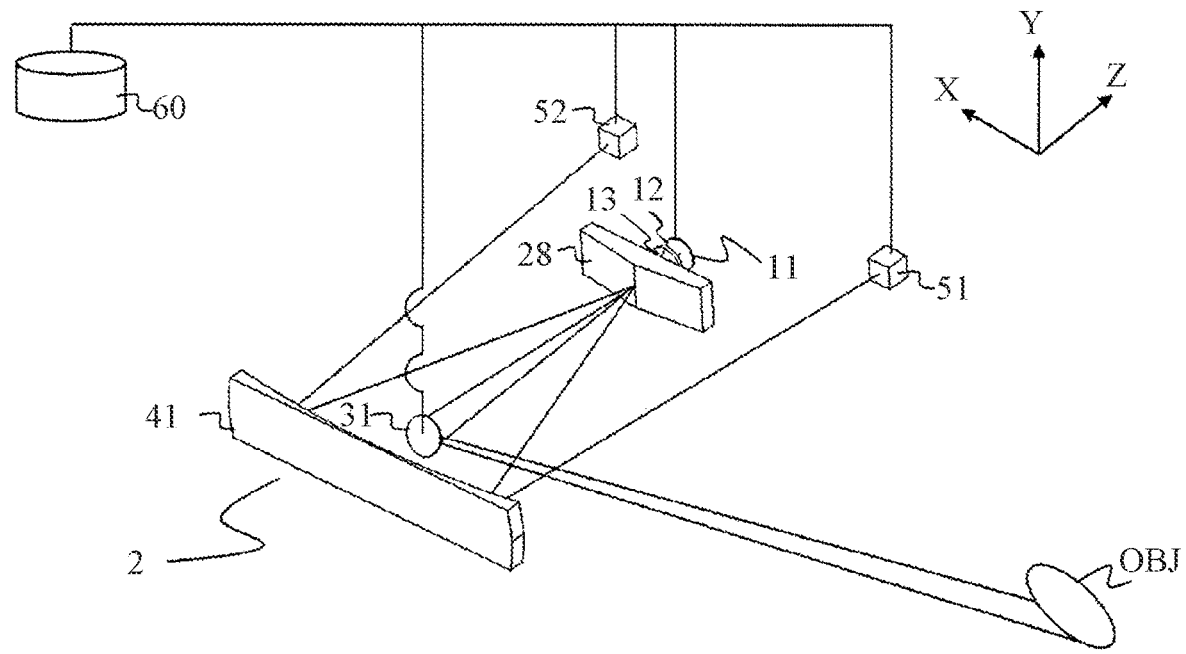
FIG. 11 is a schematic view of principal part of an optical apparatus according to a second embodiment.

FIG. 11 is a schematic view of the principal part of an optical apparatus 2 according to this embodiment. The optical apparatus 2 includes the light source 11, the collimator lens 12, the diaphragm 13, a branching optical element 28, the drive mirror (deflection unit) 31, the condenser mirror 41, the light receiving elements (light receiving units) 51 and 52, and the control unit 60. The configuration except for the branching optical element 28 is the same as that of the first embodiment, and a description thereof will be omitted.

The branching optical element 28 has a function of branching the illumination optical path and separating the illumination optical path and the light receiving optical path.

FIGS. 12A and 12B are schematic views of the principal part of the branching optical element 28 according to this embodiment. The branching optical element 28 has a first surface 281, a second surface 282, and a third surface 283. An angle formed between the first surface 281 and the second surface 282 and an angle formed between the first surface 281 and the third surface 283 are both 7.3 degrees around the Y-axis. FIG. 12A illustrates the path of the illumination light as it passes through the branching optical element 28. FIG. 12B is a view of the branching optical element 28 viewed from the −Z-axis direction.

The second surface 282 has a passage area 2821 for transmitting the illumination light and a reflective area 2822 for reflecting the reflected light from the object OBJ. The third surface 283 has a passage area 2831 for transmitting the illumination light and a reflective area 2832 for reflecting the reflected light from the object OBJ. The passage areas 2821 and 2831 have semicircular shapes with a radius of 1.6 mm in this embodiment, but the disclosure is not limited to this example. For example, it may be rectangular. In this embodiment, the areas of the passage areas 2821 and 2831 are equal to each other so that the light amounts of the illumination lights in the first optical path and the second optical path, which will be described later, are approximately equal. Antireflection films may be formed on the passage areas 2821 and 2831. A layer that reflects incident light from the outside of the branching optical element 28 is formed on each of the reflective areas 2822 and 2832 by a metal film, a dielectric film, or the like. A layer for absorbing light may be formed on a non-effective area where the incident light of the reflective areas 2822 and 2832 does not reach.

FIGS. 13A and 13B are optical path diagrams of the illumination light transmitting through the passage area (first passage area) 2821. FIGS. 14A and 14B are optical path diagrams of the illumination light transmitting through the passage area (second passage area) 2831. FIGS. 15A and 15B are optical path diagrams of the reflected light from the object OBJ illuminated by the illumination light transmitting through the passage area 2821. FIGS. 16A and 16B are optical path diagrams of the reflected light from the object OBJ illuminated by the illumination light transmitting through the passage area 2831. In each figure, FIGS. 13A, 14A, 15A, and 16A are XZ sectional views, and FIGS. 13B, 14B, 15B, and 16B are YZ sectional views.

The light that has passed through the diaphragm 13 is refracted on the first surface 281 according to Snell's law, travels in the branching optical element 28, and reaches the second surface 282 and the third surface 283. The illumination light that has reached the second surface 212 is emitted from the passage area 2821 and enters the drive mirror 31. Hereinafter, this optical path will be referred to as a first optical path (solid line in FIG. 12A). On the other hand, the illumination light that has reached the third surface 283 is emitted from the passage area 2831 and enters the drive mirror 31. Hereinafter, this optical path will be referred to as a second optical path (broken line in FIG. 12A). In this way, the illumination light is branched into two illumination lights (first illumination light and second illumination light) by the branching optical element 28, and the first and second illumination lights are emitted from the passage areas 2821 and 2831 so that their emission directions form an angle.

The illumination light of the first optical path and the illumination light of the second optical path are reflected by the drive mirror 31, pass under the branching optical element 28 and the light source 11, and then illuminate the object OBJ while being two-dimensionally scanned. Two lights emitted from the branching optical element 28 enter the drive mirror 31 at different angles and are scanned to illuminate different areas. That is, the illumination range can be expanded.

The reflected light from the object OBJ is deflected to the branching optical element 28 by the drive mirror 31. More specifically, the reflected light in the first optical path passes under the light source 11 and the branching optical element 28 in the optical path in the direction opposite to the illumination light, then enters the drive minor 31 and is deflected toward the second surface 282. Of the deflected light, the light that has reached the reflective area 2822 is reflected toward the condenser mirror 41, condensed on and received by the light receiving element 51. The reflected light in the second optical path passes under the light source 11 and the branching optical element 28 in an optical path opposite to the illumination light, then enters the drive mirror 31 and is deflected toward the third surface 283. Of the deflected light, the light that has reached the reflective area 2832 is reflected toward the condenser mirror 41, condensed on and received by the light receiving element 52.

The light emitted from the passage area 2821 and the light emitted from the passage area 2831 have angles with the same absolute value but different signs. As a result, the angles incident on the drive mirror 31 have the same absolute value but the directions are opposite to each other, so that the areas of the respective illumination ranges are equal to each other and the object OBJ can be illuminated symmetrically with respect to the Y-axis.

The illumination light in the first optical path and the illumination light in the second optical path may intersect each other before they enter the drive mirror 31. Intersected illumination lights in the first optical path and the second optical path can suppress the width of each illumination light in the first optical path and the second optical path incident on the drive mirror 31, and prevent the diameter of the drive mirror 31 from increasing.

FIGS. 17A, 17B, and 17C are schematic diagrams of the principal part of the branching optical element 29 according to a variation of the branching optical element 28. The branching optical element 29 has a first surface 291 and a second surface 292, a third surface 293, a fourth surface 294, and a fifth surface 295. FIG. 17A is a view of the branching optical element 29 viewed from the +Y-axis direction. FIG. 17B is a view of the branching optical element 29 viewed from the −Z-axis direction. FIG. 17C is a view of the branching optical element 29 viewed from the −X-axis direction.

The branching optical element 28 has two surfaces or a reflective area and a passage area, while the branching optical element 29 has four surfaces. More specifically, the second surface 292 has a passage area 2921 for transmitting the illumination light and a reflective area 2922 for reflecting the reflected light from the object OBJ. The third surface 293 is a passage area 2931 for transmitting illumination light, and a reflective area 2932 for reflecting the reflected light from the object OBJ. The fourth surface 294 has a passage area 2941 for transmitting the illumination light and a reflective area 2942 for reflecting the reflected light from the object OBJ. The fifth surface 295 has a passage area 2951 for transmitting the illumination light and a reflective area 2952 for reflecting the reflected light from the object OBJ. All of the second surface 292, the third surface 293, the fourth surface 294, and the fifth surface 295 are surfaces rotated around the X-axis and the Y-axis.

The illumination light transmitting through the first surface 231 passes through the passage areas 2921, 2931, 2941, and 2951 and enters the drive mirror 31. On the other hand, the reflected light from the drive mirror 31 is reflected in the reflective areas 2922, 2932, 2942, and 2952, introduced to and received by the light receiving element (not illustrated) corresponding to each surface.

As described above, the configuration according to this embodiment is small but can expand the scanning range.

Third Embodiment

Figure 18:
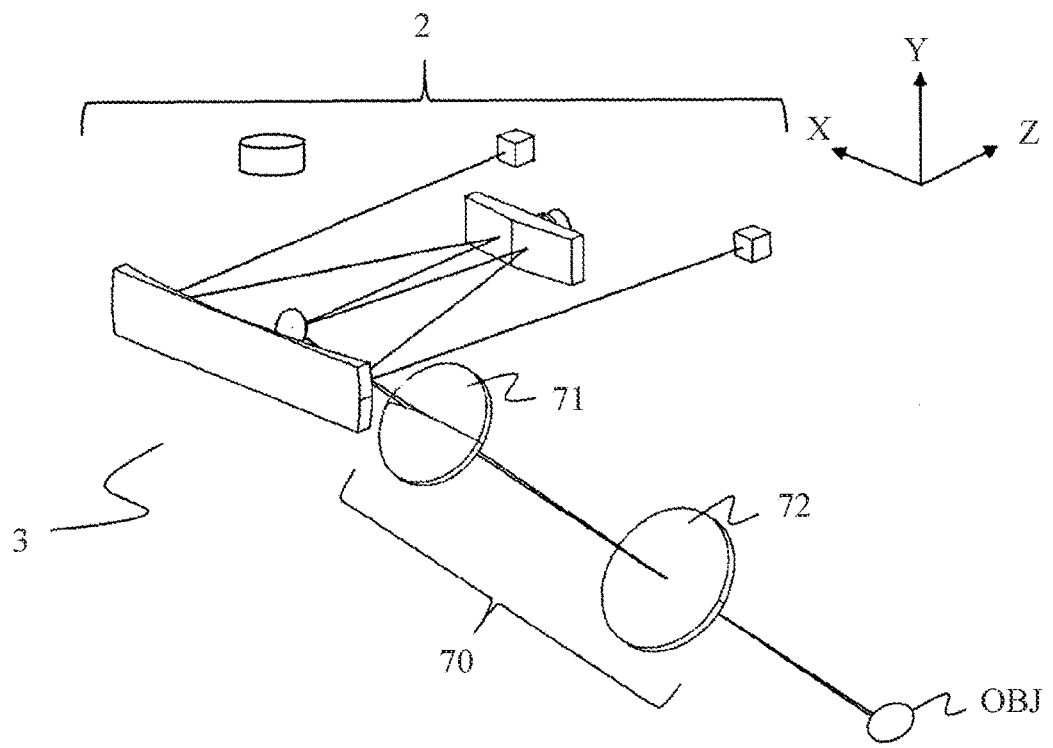
FIG. 18 is a schematic view of principal part of an optical apparatus according to a third embodiment.

FIG. 18 is a schematic view of the principal part of an optical apparatus 3 according to this embodiment. The optical apparatus 3 includes the optical apparatus 2 according to the second embodiment and a telescope 70. The configuration except for the telescope 70 is the same as that of the second embodiment, and a description thereof will be omitted.

The telescope 70 is an optical system (afocal system) that includes a plurality of optical elements (lenses) having a refractive power (power) and does not have a refractive power in the whole system. In this embodiment, the telescope 70 includes lenses 71 and 72 having positive powers. The telescope 70 is disposed on the illumination side of the drive mirror 31. The drive mirror 31 is disposed at a position (entrance pupil position) that is optically an entrance pupil of the telescope 70. An optical magnification β of the telescope 70 is larger than 1 relative to the exit pupil from the drive mirror 31 side ($|\beta|>1$).

The illumination light emitted from the light source 11 reaches the drive mirror 31 in the same optical path as that in the second embodiment, is reflected by the drive mirror 31, and enters the telescope 70. The illumination light that has entered the telescope 70 is magnified according to the optical magnification β and illuminates the object OBJ. The reflected light from the illuminated object OBJ enters the telescope 70, is reduced according to the optical magnification $1/\beta$, and reaches the drive mirror 31. The optical path after the drive mirror 31 is the same as that of the second embodiment.

The telescope 70 thus disposed can expand the light beam diameter of the illumination light and reduce the divergence angle of the illumination light. As a result, the spread of the illumination light at a distant place can be suppressed, and the resolution and the illuminance at the distant place can be improved. Moreover, the pupil diameter where the telescope 70 is disposed is larger than that where the telescope 70 is not disposed, and a larger amount of reflected light from the object OBJ can be taken in, so that the measured distance and the distance measuring accuracy can be performed.

Fourth Embodiment

Figure 19:
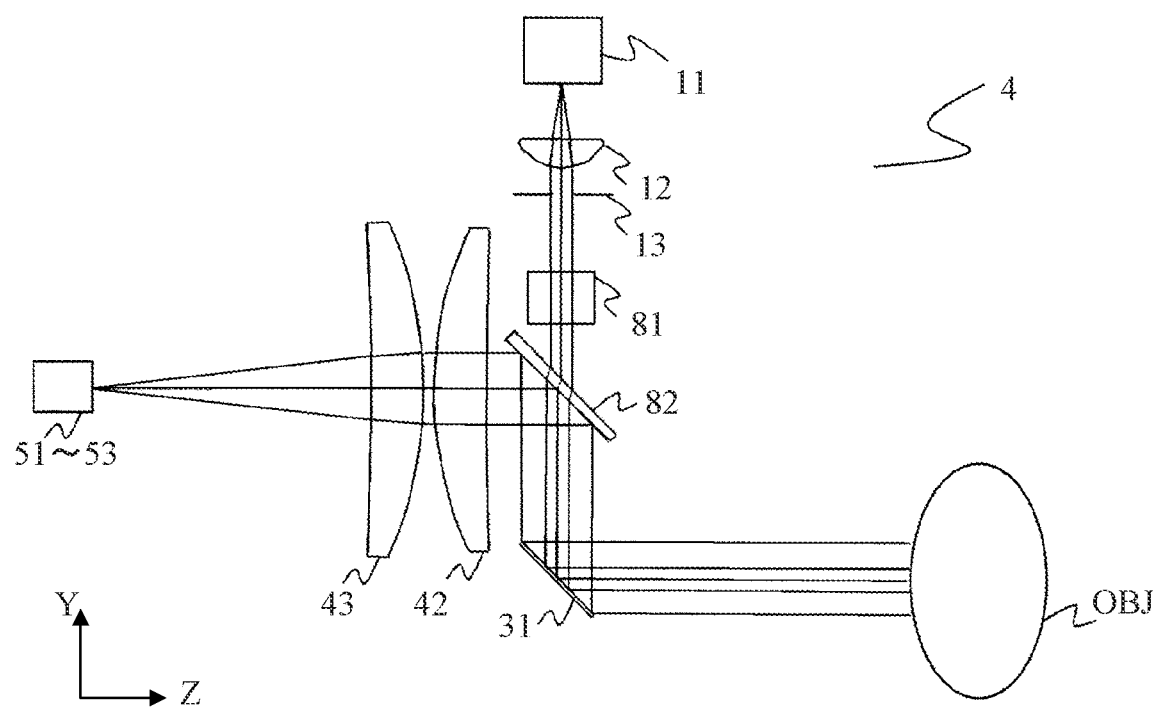
FIG. 19 is a schematic view of principal part of an optical apparatus according to a fourth embodiment.

FIG. 19 is a schematic view of the principal part of an optical apparatus 4 according to this embodiment. The optical apparatus 4 includes the light source 11, the collimator lens 12, the diaphragm 13, branching optical elements 81 and 82, the drive mirror (deflection unit) 31, condenser lenses 42 and 43, light receiving elements (light receiving units) 51 to 53, and the control unit 60 (not shown). The configuration except for the branching optical elements 81 and 82 is the same as that of the first embodiment, and a description thereof will be omitted.

Figure 20A:
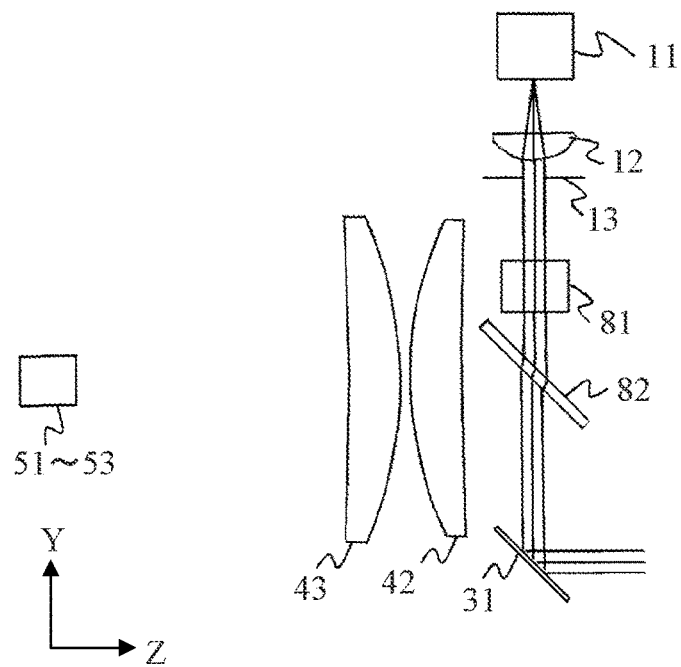
FIGS. 20A, 20B, and 20C are optical path diagrams of illumination light according to the fourth embodiment.
Figure 20B:
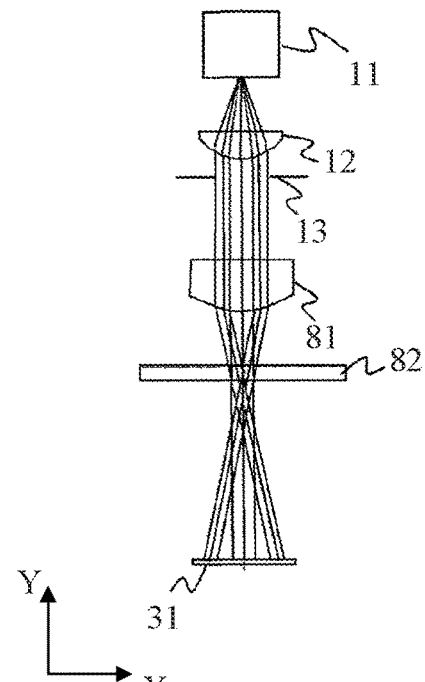
Figure 20C:
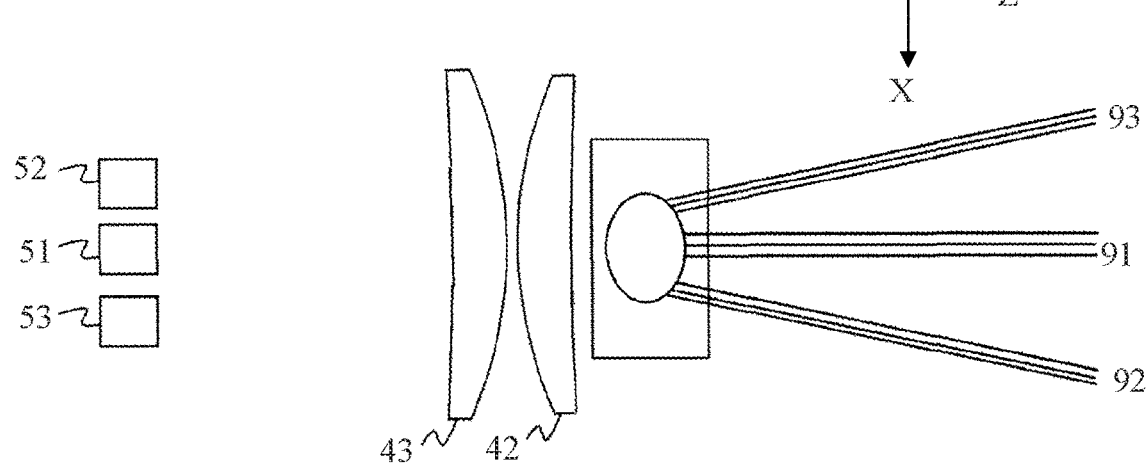

A coordinate system according to this embodiment is defined as illustrated in FIG. 19. More specifically, one swing direction of the drive mirror 31 is set to an X-axis, a direction in which light travels from the light source 11 to the drive mirror 31 is set to a Y-axis, and a direction orthogonal to the X-axis and the Y-axis is set to a Z-axis. FIGS. 20A, 20B, and 20C are optical path diagrams of the illumination light according to this embodiment. FIG. 20A is a YZ sectional view, FIG. 20B is an XY sectional view and FIG. 20C is a bottom view viewed from a −Y-axis direction.

The branching optical element 81 has a function of branching the illumination optical path, and the branching optical element 82 has a function of separating the illumination optical path and the light receiving optical path.

FIGS. 21A and 21B are schematic diagrams of the principal parts of the branching optical elements 81 and 82 according to this embodiment. FIG. 21A illustrates the configurations of the branching optical elements 81 and 82 and the illumination optical path passing through the branching optical elements 81 and 82. The branching optical element 81 has a first surface 811, a second surface 812, a third surface 813, and a fourth surface 814. An angle formed between the second surface 812 and the third surface 813 and an angle formed between the second surface 812 and the fourth surface 814 are 21.4 degrees with the same absolute value and different signs around the Z-axis.

In a case where the above semiconductor laser is used for the light source 11, as illustrated in FIG. 22, the light amount distribution of the illumination light has an approximately Gaussian distribution. The illumination light travels from the first surface 811 into the branching optical element 81 after its periphery is shielded by the diaphragm 13. The light beam near the center of the illumination light passes through the second surface 812. This optical path will be referred to as a first optical path 91. The light beam passing through the first optical path 91 has a light amount distribution 91a illustrated in FIG. 22. A part of the light beam near the periphery of the illumination light passes through the third surface 813. This optical path will be referred to as a second optical path 92. The light beam passing through the second optical path 92 has a light amount distribution 92a illustrated in FIG. 22. The other part of the light beam near the periphery of the illumination light passes through the fourth surface 814. This optical path will be referred to as a third optical path 93. The light beam passing through the third optical path 93 has a light amount distribution 93a illustrated in FIG. 22. In this embodiment, the light amount of light beam passing through the first optical path 91 is larger than that of the light beam passing through the second optical path 92 and that of the light beam passing through the third optical path 93. Since the third surface 813 and the fourth surface 814 have an angle relative to the second surface 812, the second optical path 92 and the third optical path 93 have angles of 12.0 degrees with the same absolute value and different signs relative to the first optical path 91.

The branching optical element 82 has a first surface 821 and a second surface 822. FIG. 21B is a view of the branching optical element 82 viewed from the plane normal direction of the second surface 822. The second surface 822 has a passage area 8221 for transmitting the illumination light and a reflective area 8222 for reflecting the reflected light from the object OBJ. The passage area 8221 has a rectangular shape of 2.5×6.6 mm in this embodiment, but the disclosure is not limited to this example. For example, it may have an elliptical shape. An antireflection film may be formed on the passage area 8221. A layer for reflecting incident light from the outside of the branching optical element 82 may be formed on the reflective area 8222 by a metal film, a dielectric film, or the like. A layer for absorbing light may be formed on a non-effective area where the incident light of the reflective area 8222 does not reach.

Each light beam emitted from the branching optical element 81 enters the first surface 821 of the branching optical element 82 and is emitted from the passage area 8221 of the second surface 822. Since the branched light beam passes through the same passage area, assembly adjustment can be easy.

The light beams emitted from the branching optical element 82 and passing through the first to third optical paths 91 to 93 are reflected by the drive mirror 31 and two-dimensionally scanned, and illuminate the object OBJ. Three light beams emitted from the branching optical element 81 enter the drive mirror 31 at different angles and are scanned to illuminate different areas. That is, the illumination range can be expanded.

Figure 23A:
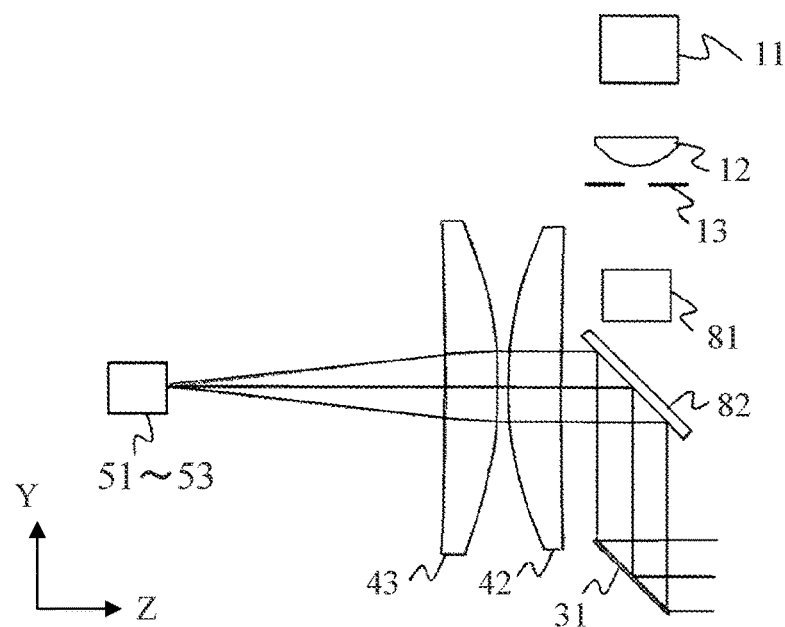
FIGS. 23A and 23B are optical path diagrams of reflected light according to the fourth embodiment.
Figure 23B:
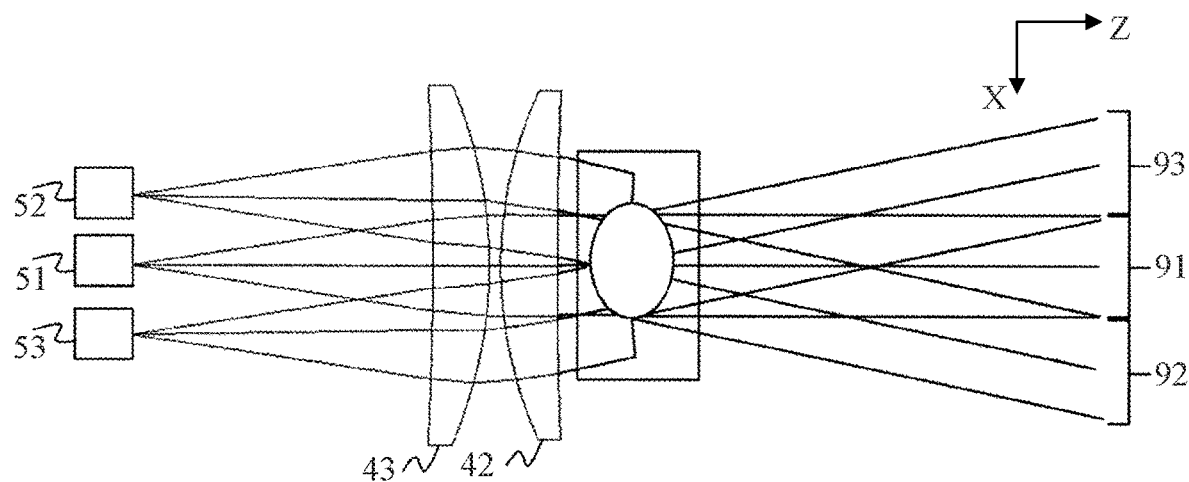

FIGS. 23A and 23B are optical path diagrams of the reflected light according to this embodiment. FIG. 23A is a YZ sectional view, and FIG. 23B is a bottom view viewed from the −Y direction. The reflected light in each optical path from the object OBJ is deflected to the branching optical element 82 by the drive mirror 31. Of the deflected light, the light that has reached the reflective area 8222 is reflected toward the condenser lens 42 and passes through the condenser lens 43. The light beam passing through the first optical path 91 is condensed on and received by the light receiving element 51, the light beam passing through the second optical path 92 is condensed on and received by the light receiving element 52, and the light beam passing through the third optical path 93 is condensed on and received by the light receiving element 53. That is, in this embodiment, each light beam reflected by the branching optical element 82 passes through the same lens and is condensed on the light receiving element.

This embodiment uses the condenser lens, and thus can reduce the size of the entire apparatus unlike the mirror. The distance between the light receiving elements can be narrowed, and each light receiving element can be disposed on the same substrate or an array of light receiving elements can be used.

The entrance pupil of the condensing optical system (common optical system) including the condenser lenses 42 and 43 may be located above the drive mirror 31. Thereby, the principal ray of each reflected light beam can approximately vertically enter the light receiving element. Generally, the closer to vertical incidence the angle is, the higher sensitivity the light receiving element has, so that the detecting distance can be extended in a case where the entire light beams enter the light receiving element at small angles.

As described above, since a light amount of the light beam passing through the first optical path 91 is larger than a light amount of the light beam passing through the second optical path 92 and a light amount of the light beam of the light beam passing through the third optical path 93, a reflected light amount can be increased and consequently the measurable distance can be increased. In this embodiment, a wide-angle scheme can be realized by branching the illumination light into three while the distance is measured farther with a light beam passing a position near the center of the angle of view.

FIG. 24A is a schematic diagram of the principal part of the branching optical element 83 according to a variation of the branching optical element 81, and FIG. 24B is a diagram showing a light amount distribution of the illumination light passing through the branching optical element 83. The branching optical element 83 has a first surface 831, a second surface 832, a third surface 833, and a fourth surface 834. An angle formed between the first surface 831 and the second surface 832, and an angle formed between the first surface 831 and the third surface 833 are 22.8 degrees with the same absolute value and different signs around the Z-axis.

The illumination light travels in the branching optical element 83 after its periphery is shielded by the diaphragm 13. The light beam near the center of the illumination light passes through the first surface 831. This optical path will be referred to as a first optical path 91. The light beam passing through the first optical path 91 has a light amount distribution 91a illustrated in FIG. 24B. Part of the light beam near the periphery of the illumination light passes through the second surface 832. This optical path will be referred to as a second optical path 92. The light beam passing through the second optical path 92 has a light amount distribution 92a illustrated in FIG. 24B. The other part of the light beam near the periphery of the illumination light passes through the third surface 833. This optical path will be referred to as a third optical path 93. The light beam passing through the third optical path 93 has a light amount distribution 93a illustrated in FIG. 24B. This embodiment makes light amounts larger in order of the light amount of the light beam passing through the third optical path 93, the light amount of the light beam passing through the first optical path 91, and the light amount of the light beam passing through the second optical path 92. Since the second surface 832 and the third surface 833 form an angle relative to the first surface 831, the second optical path 92 and the third optical path 93 have angles with the same absolute value and different signs relative to the first optical path 91. The light beams passing through the first optical path 91 to the third optical path 93 are emitted from the fourth surface 834 and enter the branching optical element 82, respectively.

FIGS. 25A and 25B are schematic diagrams of the principal part of the branching optical element 85 according to a variation of the branching optical elements 81 and 82. FIG. 25A is an XY sectional view and FIG. 25B is a YZ sectional view. The branching optical element 85 has a first surface 851, a second surface 852, a third surface 853, and a fourth surface 854. An angle formed between the first surface 851 and the second surface 852 and an angle formed between the first surface 851 and the third surface 853 are 30.0 degrees with the same absolute value and different signs around the Z-axis. An angle formed between the first surface 851 and the fourth surface 854 is 33.5 degrees around the X-axis.

The fourth surface 854 has a passage area 8541 for transmitting the illumination light and a reflective area 8542 for reflecting the reflected light from the object OBJ.

The illumination light travels in the branching optical element 85 after its periphery is shielded by the diaphragm 13. The light beam near the center of the illumination light passes through the first surface 851. This optical path will be referred to as a first optical path 91. Part of the light beam near the periphery of the illumination light passes through the second surface 852. This optical path will be referred to as a second optical path 92. The other part of the light beam near the periphery of the illumination light passes through the third surface 853. This optical path will be referred to as a third optical path 93. In this embodiment, the light amount of light beam passing through the first optical path 91 is larger than the light amount of light beam passing through the second optical path 92 and the light amount of light beam passing through the third optical path 93. Since the second surface 852 and the third surface 853 have angles relative to the first surface 851, the second optical path 92 and the third optical path 93 have angles with the same absolute value and different signs relative to the first optical path 91. The light beams passing through the first optical path 91 to the third optical path 93 are emitted from the passage area 8541 of the fourth surface 854, respectively. In this embodiment, as illustrated in FIG. 25B, since the illumination light is emitted downward from the passage area 8541, the drive mirror 31 is also disposed downward.

On the other hand, the reflected light from the object OBJ is deflected to the branching optical element 85 by the drive mirror 31. Of the deflected light, the light that has reached the reflective area 8542 is reflected toward the condenser lens 42.

In this variation, the two branching optical elements are integrated with each other and thus the cost can be reduced by reducing the number of components and the number of assembling steps.

In this embodiment, a light amount of the illumination light from the light source follows a Gaussian distribution, but the disclosure is not limited to this light amount distribution and may be a uniform or annular distribution.

In-Vehicle System

Figure 26:
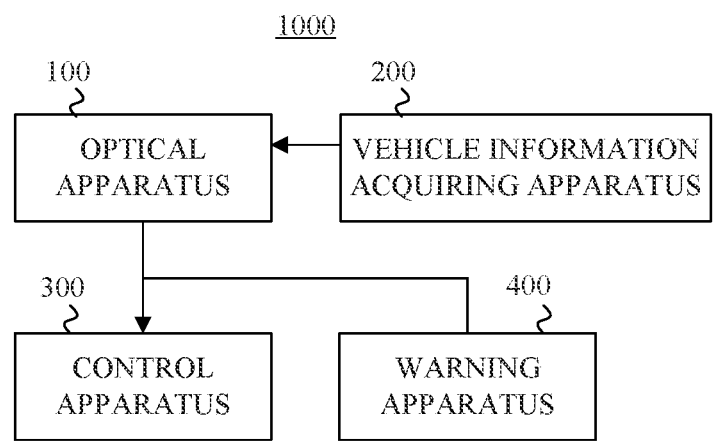
FIG. 26 is a configuration diagram of an in-vehicle system according to this embodiment.
Figure 27:
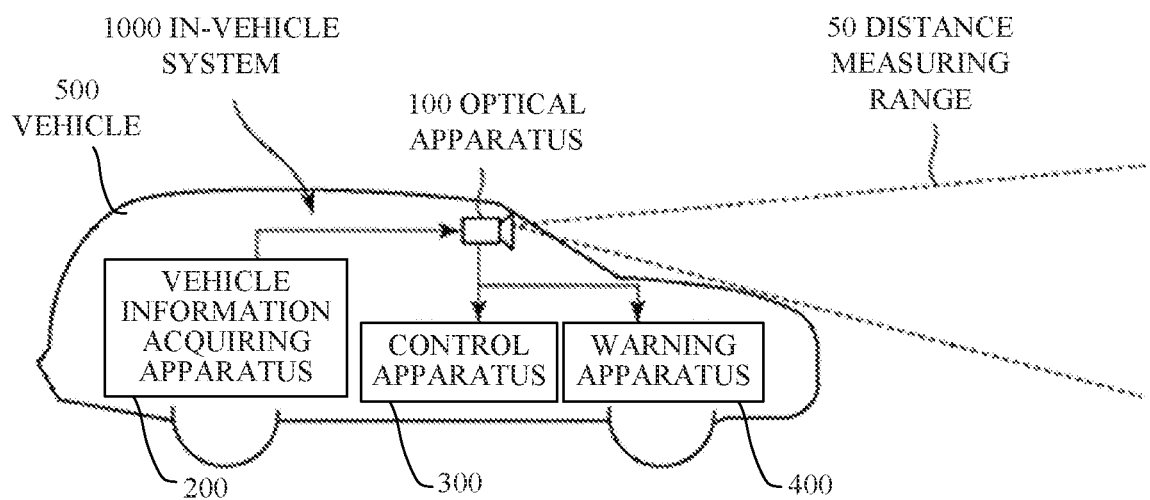
FIG. 27 is a schematic diagram of a vehicle (moving apparatus) according to this embodiment.

FIG. 26 is a configuration diagram of an optical apparatus 100, which is one of the optical apparatuses according to respective embodiments, and an in-vehicle system (driving support apparatus) 1000 having the same. The in-vehicle system 1000 is an apparatus held by a movable moving body (moving apparatus) such as an automobile (vehicle), and configured to support driving (steering) of the vehicle based on distance information on an object such as an obstacle or a pedestrian around the vehicle acquired by the optical apparatus 100. FIG. 27 is a schematic diagram of a vehicle 500 including the in-vehicle system 1000. FIG. 27 illustrates a case where the distance measurement range (detection range) of the optical apparatus 100 is set to the front of the vehicle 500, but the distance measurement range may be set to the rear or side of the vehicle 500.

As illustrated in FIG. 26, the in-vehicle system 1000 includes the optical apparatus 100, a vehicle information acquiring apparatus 200, a control apparatus (ECU: electronic control unit) 300, and a warning apparatus (warning unit) 400. In the in-vehicle system 1000, the control unit 60 included in the optical apparatus 100 has functions of a distance acquiring unit (acquiring unit) and a collision determining unit (determining unit). However, if necessary, the in-vehicle system 1000 may include a distance acquiring unit and a collision determining unit separate from the control unit 60, or each may be provided outside of the optical apparatus 100 (for example, inside the vehicle 500). Alternatively, the control apparatus 300 may be used as the control unit 60.

Figure 28:
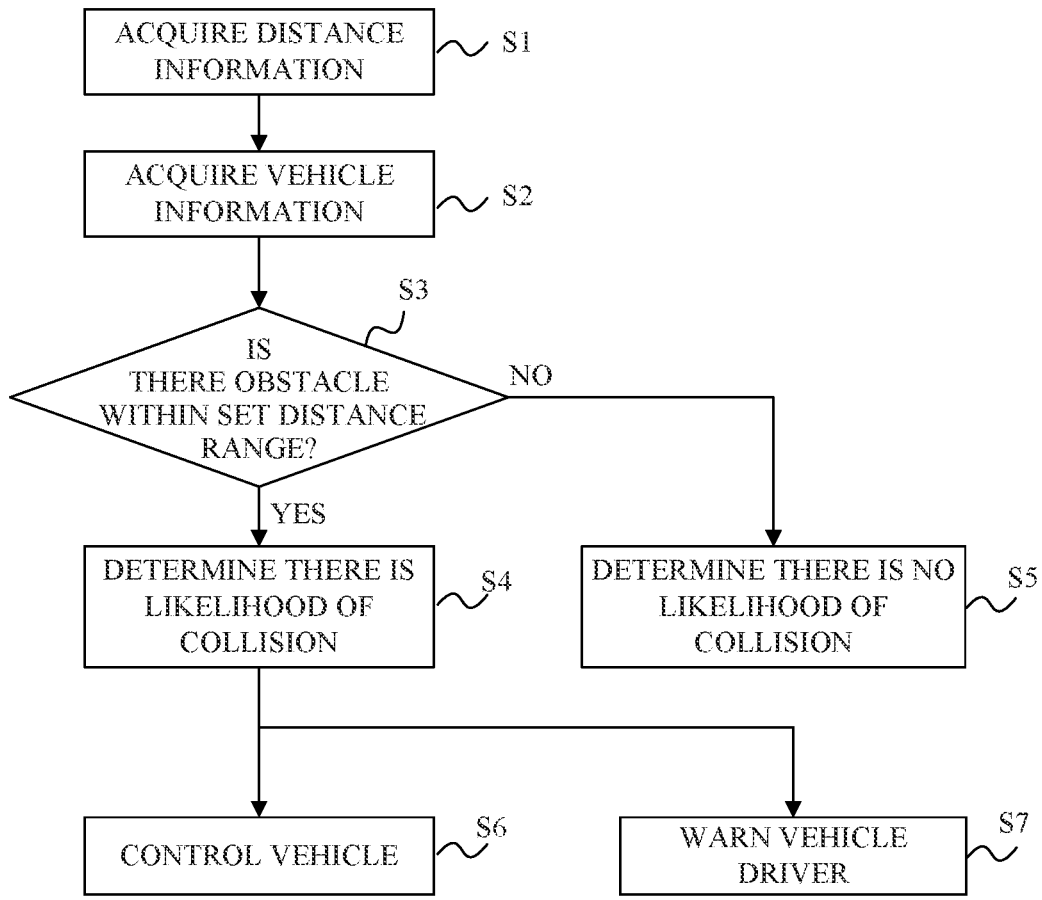
FIG. 28 is a flowchart showing an operation example of the in-vehicle system according to this embodiment.

FIG. 28 is a flowchart showing an operation example of the in-vehicle system 1000 according to this embodiment. A description will now be given of the operation of the in-vehicle system 1000 with reference to this flowchart.

First, in step S1, the light source unit of the optical apparatus 100 illuminates the object around the vehicle, and the control unit 60 acquires the distance information on the object based on the signal output from the light receiving element by receiving the reflected light from the object. In step S2, the vehicle information acquiring apparatus 200 acquires vehicle information including the speed, yaw rate, steering angle of the vehicle, and the like. Then, in step S3, the control unit 60 determines whether the distance to the object is included within a preset distance range using the distance information acquired in step S1 and the vehicle information acquired in step S2.

This configuration can determine whether or not the object exists within the set distance range around the vehicle, and determine a likelihood of collision between the vehicle and the object. Steps S1 and S2 may be performed in the reverse order of the above order or in parallel with each other. The control unit 60 determines that "there is the likelihood of collision" in a case where the object exists within the set distance (step S4) and determines "there is no likelihood of collision" in a case where the object does not exist within the set distance (step S5).

Next, in the case where the control unit 60 determines that "there is a likelihood of collision," the control unit 60 notifies (transmits) the determination result to the control apparatus 300 and the warning apparatus 400. At this time, the control apparatus 300 controls the vehicle based on the determination result of the control unit 60 (step S6), and the warning apparatus 400 warns the user (driver) of the vehicle based on the determination result of the control unit 60 (step S7). The determination result may be notified to at least one of the control apparatus 300 and the warning apparatus 400.

The control apparatus 300 can control the movement of the vehicle by outputting a control signal to a driving unit (engine, motor, etc.) of the vehicle. For example, in the vehicle, control can be made such as applying a brake, releasing an accelerator, turning a steering wheel, generating a control signal for generating a braking force on each wheel, and suppressing the output of the engine or motor. The warning apparatus 400 warns the vehicle driver, for example, by issuing a warning sound, displaying warning information on the screen of a car navigation system, or vibrating a seat belt or steering.

Thus, the in-vehicle system 1000 according to this embodiment can detect the object and measure the distance by the above processing, and avoid the collision between the vehicle and the object. In particular, applying the optical apparatus according to each of the embodiments to the in-vehicle system 1000 can realize high distance measuring accuracy, so that object detection and collision determination can be performed with high accuracy.

This embodiment applies the in-vehicle system 1000 to the driving support (collision damage mitigation), but the in-vehicle system 1000 is not limited to this example and is applicable to cruise control (including adaptive cruise control) and automatic driving. The in-vehicle system 1000 is applicable not only to a vehicle such as an automobile but also to a moving body such as a ship, an aircraft, or an industrial robot. It can be applied not only to moving objects but also to various devices that utilize object recognition such as intelligent transportation systems (ITS) and monitoring systems.

The in-vehicle system 1000 and the moving apparatus may include a notification apparatus (notifying unit) for notifying the manufacturer of the in-vehicle system, the seller (dealer) of the moving apparatus, or the like of any collisions between the vehicle 700 and the obstacle. For example, the notification apparatus may use an apparatus that transmits information (collision information) on the collision between the vehicle 700 and the obstacle to a preset external notification destination by e-mail or the like.

Thus, the configuration for automatically notifying the collision information through the notification apparatus can promote processing such as inspection and repair after the collision. The notification destination of the collision information may be an insurance company, a medical institution, the police, or another arbitrary destination set by the user. The notification apparatus may notify the notification destination of not only the collision information but also the failure information on each component and consumption information on consumables. The presence or absence of the collision may be detected based on the distance information acquired by the output from the above light receiving unit or by another detector (sensor).

The disclosure can provide an optical apparatus, an in-vehicle system, and a moving apparatus, each of which is small and has a wide scanning range.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An optical apparatus comprising:
a deflection unit configured to deflect illumination light from a light source to scan an object, and to deflect reflected light from the object; and
a light guide unit configured to guide the illumination light to the deflection unit, and to guide the reflected light from the deflection unit to a light receiving unit,
wherein the light guide unit includes a first passage area and a second passage area through which the illumination light passes, and a reflective area for reflecting the reflected light,
wherein the illumination light is branched into first illumination light and second illumination light by the light guide unit, and
wherein the first illumination light is emitted from the first passage area and the second illumination light is emitted from the second passage area so that an emission direction of the first illumination light and an emission direction of the second illumination light are not parallel to each other, and then the first illumination light and the second illumination light enter the deflection unit.

2. The optical apparatus according to claim 1, wherein the illumination light is branched by spatially dividing part of a light beam by the light guide unit.

3. The optical apparatus according to claim 1, wherein the illumination light is branched by dividing a light intensity by the light guide unit.

4. The optical apparatus according to claim 1, wherein the illumination light is branched by dividing the illumination light into a first polarization component and a second polarization component orthogonal to the first polarization component by the light guide unit.

5. The optical apparatus according to claim 1, wherein the first illumination light and the second illumination light have light amounts equal to each other.

6. The optical apparatus according to claim 1, wherein the first illumination light and the second illumination light have light amounts different from each other.

7. The optical apparatus according to claim 1, wherein the light guide unit includes a first surface which the illumination light enters and a reflective surface for reflecting the illumination light, and
wherein the second illumination light from the first surface is branched in the light guide unit, then reflected by the reflective surface, and emitted from the second passage area.

8. The optical apparatus according to claim 7, wherein the optical apparatus satisfies the following expression, $$\alpha_1+\alpha_2=90$$

where $\alpha_1$ is an angle formed between the first surface and the second passage area or the reflective area, and $\alpha_2$ is an angle formed between the second passage area or the reflective area and the reflective surface.

9. The optical apparatus according to claim 1, wherein the light guide unit expands a light beam diameter of the illumination light.

10. The optical apparatus according to claim 1, wherein the first and second passage areas are common.

11. The optical apparatus according to claim 1, wherein the light guide unit includes a second surface having the first passage area and the reflective area, and a third surface having the second passage area and the reflective area.

12. The optical apparatus according to claim 11, wherein the first illumination light and the second illumination light intersect each other before entering the deflection unit.

13. The optical apparatus according to claim 1, wherein reflected light of the first illumination light and reflected light of the second illumination light pass through a common optical system after passing through the light guide unit and before entering the light receiving unit.

14. The optical apparatus according to claim 13, wherein an entrance pupil of the common optical system is located above the deflection unit.

15. The optical apparatus according to claim 13, wherein the common optical system includes a condenser mirror.

16. The optical apparatus according to claim 1, further comprising a telescope configured to increase a light beam diameter of the illumination light deflected by the deflection unit and to reduce a light beam diameter of the reflected light from the object.

17. The optical apparatus according to claim 16, wherein the deflection unit is disposed at an entrance pupil position of the telescope.

18. The optical apparatus according to claim 1, wherein an illumination range of the first illumination light and an illumination range of the second illumination light partially overlap each other.

19. The optical apparatus according to claim 1, further comprising a control unit configured to acquire distance information on the object based on an output from the light receiving unit.

20. An in-vehicle system comprising the optical apparatus according to claim 1, and configured to determine a likelihood of collision between a vehicle and the object based on distance information on the object acquired by the optical apparatus.

21. The in-vehicle system according to claim 20, further comprising a control apparatus configured to output a control signal for generating a braking force in the vehicle in a case where the in-vehicle system determines that there is the likelihood of collision between the vehicle and the object.

22. The in-vehicle system according to claim 20, further comprising a warning apparatus configured to warn a user of the vehicle in a case where the in-vehicle system determines that there is the likelihood of collision between the vehicle and the object.

23. The in-vehicle system according to claim 20, further comprising a notification apparatus configured to notify information on the collision between the vehicle and the object to outside.

24. A moving apparatus comprising the optical apparatus according to claim 1, and configured to hold the optical apparatus and to move.

25. The moving apparatus according to claim 24, further comprising a determining unit configured to determine a likelihood of collision with the object based on distance information on the object acquired by the optical apparatus.

26. The moving apparatus according to claim 25, further comprising a control unit configured to output a control signal for controlling movement in a case where the determining unit determines that there is the likelihood of collision with the object.

27. The moving apparatus according to claim 25, further comprising a warning unit configured to warn a user of the moving apparatus in a case where the determining unit determines that there is the likelihood of collision with the object.

28. The moving apparatus according to claim 24, comprising a notifying unit configured to notify information on a collision with the object to outside.

* * * * *